US012781158B2

(12) United States Patent
Walravens et al.

(10) Patent No.: US 12,781,158 B2
(45) Date of Patent: Nov. 3, 2026

(54) PROCESS OF MAKING A WATER-SOLUBLE UNIT DOSE ARTICLE

(71) Applicant: The Procter & Gamble Company, Cincinnati, OH (US)

(72) Inventors: Wouter Walravens, Humbeek (BE); Karel Jozef Maria Depoot, Anzegem (BE); Mark Robert Sivik, Mason, OH (US); Antonio Quintieri, Waterloo (BE); Kristine Lynn Niehaus, Harrison, OH (US); Katrien Van Roey, Werchter (BE); Helen Lu, Wallingford, PA (US); Michael D. Gagnon, West Grove, PA (US); Ilkka Ilari Kruus, Oegstgeest (NL)

(73) Assignee: The Procter & Gamble Company, Cincinnati, OH (US)

( * ) Notice: Subject to any disclaimer, the term of this patent is extended or adjusted under 35 U.S.C. 154(b) by 615 days.

(21) Appl. No.: 18/326,071

(22) Filed: May 31, 2023

(65) Prior Publication Data

US 2024/0141257 A1 May 2, 2024

Related U.S. Application Data

(60) Provisional application No. 63/416,055, filed on Oct. 14, 2022.

(51) Int. Cl.

| | |
|---|---|
| ***C11D 3/00*** | (2006.01) |
| ***C11D 3/22*** | (2006.01) |
| ***C11D 3/43*** | (2006.01) |
| ***C11D 11/00*** | (2006.01) |
| ***C11D 17/04*** | (2006.01) |

(52) U.S. Cl.

CPC ................ *C11D 3/227* (2013.01); *C11D 3/43* (2013.01); *C11D 11/0094* (2013.01); *C11D 17/043* (2013.01); *C11D 17/045* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 4,411,891 | A | 10/1983 | Mizutani et al. |
| 9,957,334 | B2 | 5/2018 | Dennes et al. |
| 10,800,860 | B2 | 10/2020 | Dennes et al. |
| 10,844,324 | B2 | 11/2020 | Dicosimo et al. |

(Continued)

FOREIGN PATENT DOCUMENTS

| | | | |
|---|---|---|---|
| AU | 2017376773 | B2 | 6/2019 |
| CA | 3002666 | A1 | 6/2017 |

(Continued)

OTHER PUBLICATIONS

All Office Actions; U.S. Appl. No. 19/181,939, filed Apr. 17, 2025.

(Continued)

*Primary Examiner* — Necholus Ogden, Jr.

(74) *Attorney, Agent, or Firm* — Abigail O. Idokogi; Andrew J. Mueller

(57) ABSTRACT

The present invention relates to a process for making a water-soluble unit dose article. The present invention also contemplates a process for making a premix.

21 Claims, 1 Drawing Sheet

(56) References Cited

U.S. PATENT DOCUMENTS

| | | | | |
|---|---|---|---|---|
| 11,352,589 | B2 | 6/2022 | Dicosimo et al. | |
| 11,584,901 | B2 | 2/2023 | Huang et al. | |
| 11,905,495 | B2 | 2/2024 | Sivik | |
| 11,958,916 | B2 | 4/2024 | Kasat | |
| 2015/0232785 | A1* | 8/2015 | Paullin | C11D 3/222 536/120 |
| 2015/0259439 | A1 | 9/2015 | Nambiar et al. | |
| 2016/0122445 | A1 | 5/2016 | Nambiar et al. | |
| 2016/0311935 | A1 | 10/2016 | Dennes et al. | |
| 2017/0259976 | A1 | 9/2017 | Lee et al. | |
| 2018/0312781 | A1 | 11/2018 | DiCosimo et al. | |
| 2019/0048288 | A1 | 2/2019 | Bouniol et al. | |
| 2019/0185893 | A1* | 6/2019 | Guan | C12P 19/08 |
| 2020/0002646 | A1 | 1/2020 | Huang et al. | |
| 2021/0395655 | A1 | 12/2021 | Depoot et al. | |
| 2022/0162523 | A1 | 5/2022 | Andriessen et al. | |
| 2022/0186156 | A1 | 6/2022 | Courchay et al. | |
| 2022/0186158 | A1* | 6/2022 | Courchay | B65D 81/3261 |
| 2023/0235097 | A1 | 7/2023 | Adelman | |

FOREIGN PATENT DOCUMENTS

| | | | |
|---|---|---|---|
| EP | 2399979 | A1 | 12/2011 |
| EP | 3628691 | A1 | 4/2020 |
| EP | 3535369 | B1 | 9/2020 |
| EP | 3922703 | A1 | 12/2021 |
| EP | 3926030 | A1 | 12/2021 |
| JP | 2000129288 | A | 5/2000 |
| WO | 2015192971 | A1 | 12/2015 |
| WO | 2015195960 | A1 | 12/2015 |
| WO | 2016160738 | A2 | 10/2016 |
| WO | 2017083226 | A1 | 5/2017 |
| WO | 2017083228 | A1 | 5/2017 |
| WO | 2017083229 | A1 | 5/2017 |
| WO | 2017091533 | A1 | 6/2017 |
| WO | 2017102306 | A1 | 6/2017 |
| WO | 2017218391 | A1 | 12/2017 |
| WO | 2018081263 | A1 | 5/2018 |
| WO | 2018112187 | A1 | 6/2018 |
| WO | 2021257786 | A1 | 12/2021 |
| WO | 2021257793 | A1 | 12/2021 |
| WO | 2021257932 | A1 | 12/2021 |

OTHER PUBLICATIONS

Unpublished U.S. Appl. No. 19/181,939, filed Apr. 17, 2025, to Mark Robert Sivik et al.

All Office Actions; U.S. Appl. No. 17/350,086, filed Jun. 17, 2021.

All Office Actions; U.S. Appl. No. 17/351,616, filed Jun. 18, 2021.

All Office Actions; U.S. Appl. No. 18/411,395, filed Jan. 12, 2024.

EP Extended EPO Search Report and Opinion, Application No. 23176592.6 dated Feb. 27, 2024, 08 pages.

Unpublished U.S. Appl. No. 18/411,395, filed Jan. 12, 2024, to Mark Robert Sivik et al.

* cited by examiner

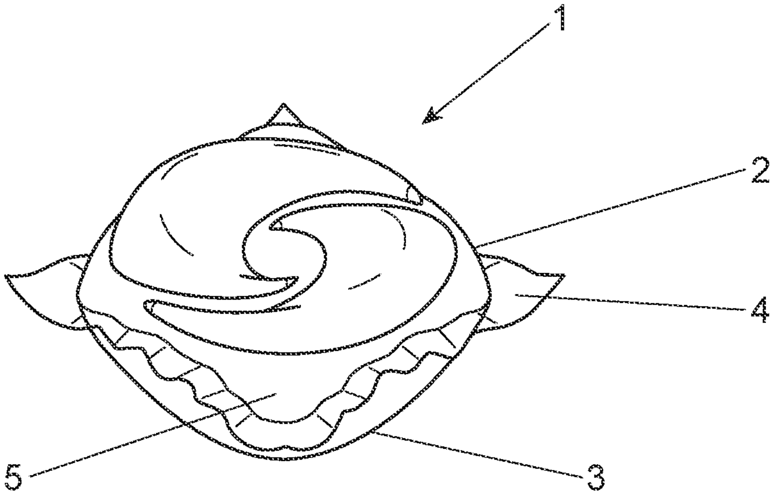
1
2
4
5
3

PROCESS OF MAKING A WATER-SOLUBLE UNIT DOSE ARTICLE

FIELD OF THE INVENTION

The present invention relates to a process for making a water-soluble unit dose article. The present invention also contemplates a process for making a premix.

BACKGROUND OF THE INVENTION

Water-soluble unit dose articles are liked by consumers as they offer convenience and ease to the laundry process. Without wishing to be bound by theory, the water-soluble unit dose article comprises a water-soluble film and a unitized dose of a laundry treatment composition which may be with one or more compartments within the unit dose article.

There is a desire for such water-soluble unit dose articles to provide a laundry treatment benefit of both fabric cleaning and fabric enhancing. Fabric enhancing includes benefits such as fabric shape retention, fabric softness and fabric freshness, whiteness, color maintenance and rejuvenation. Fabric freshness is provided by the use of perfumes and perfume delivery technologies.

Without wishing to be bound by theory, water-soluble unit dose article comprising a polyvinylalcohol water-soluble film and a cationically modified poly alpha-1,6-glucan ether compound were found to provide excellent fabric shape retention and fabric softness whilst exhibiting excellent fabric freshness benefit.

However, an issue encountered during manufacture of the water-soluble unit dose article, is that addition of the cationically modified poly alpha-1,6-glucan ether compound results in the liquid detergent composition becoming too viscous which affects the ability to dose it into the open cavity whilst making the water-soluble unit dose article.

It was surprisingly found that the process according to the present invention overcame this issue in which the viscosity of the liquid detergent composition was controlled to within acceptable levels enabling the water-soluble unit dose article to be successfully manufactured.

SUMMARY OF THE INVENTION

A first aspect of the present invention is a process of making a water-soluble unit dose article comprising the steps of;

a. deforming a first water-soluble film to create an open cavity;

b. filling the open cavity with a liquid detergent composition;

c. closing the open cavity with a water-soluble lid, wherein the water-soluble lid comprises a second water-soluble film;

d. sealing the first water-soluble film and the water-soluble lid together to create the water-soluble unit dose article;

e. optionally separating the water-soluble unit dose article from neighbouring water-soluble unit dose articles;

wherein, the liquid detergent composition is prepared by the following steps;

i. providing a liquid detergent base, wherein the liquid detergent base comprises one or more detergent actives, one or more organic solvents, or a mixture thereof, and separately providing a cationically modified poly alpha-1,6-glucan ether compound premix;

ii. mixing the liquid detergent base and the cationically modified poly alpha-1,6-glucan ether compound premix;

iii. optionally adding one or more further detergent ingredients to the liquid detergent base comprising the cationically modified poly alpha-1,6-glucan ether compound to create a liquid detergent composition;

wherein, the cationically modified poly alpha-1,6-glucan ether compound premix comprises;

from 20% to 50% or from 25% to 40%, or from 30% to 35% by weight of the premix of the cationically modified poly alpha-1,6-glucan ether compound;

from 15 to 75%, or from 20% to 70%, or from 25% to 50%, or from 30% to 40% by weight of one or more organic solvents;

less than 50%, preferably less than 45%, preferably less than 40%, more preferably less than 35%, or even from 10% to 35%, or even from 30% to 35% by weight of water.

A second aspect of the present invention is a process for making a cationically modified poly alpha-1,6-glucan ether compound premix comprising the steps of;

a. mixing a cationically modified poly alpha-1,6-glucan ether compound in solid form and one or more organic solvents to create a poly alpha-1,6-glucan ether compound premix; or b. mixing a cationically modified poly alpha-1,6-glucan ether compound in solid form or liquid form and one or more organic solvents to create a poly alpha-1,6-glucan ether compound intermediate, then removing the solvents to create a concentrated a poly alpha-1,6-glucan ether compound premix.

BRIEF DESCRIPTION OF THE DRAWINGS

FIG. 1 is a water-soluble unit dose article according to the present invention.

DETAILED DESCRIPTION OF THE INVENTION

Water-Soluble Unit Dose Article

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the laundry treatment composition does not leak out of the compartment during storage. However, upon addition of the water-soluble unit dose article to water, the water-soluble film dissolves/disintegrates and releases the contents of the internal compartment into the wash liquor.

The compartment should be understood as meaning a closed internal space within the unit dose article, which holds the liquid laundry treatment composition. During manufacture, a first water-soluble film may be shaped to comprise an open compartment into which the liquid laundry treatment composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments, or even at least four compartments. The compartments may be arranged in superposed orientation, i.e., one positioned on top of the other. In such an orientation the unit dose article will comprise at least three films, top, at least one middle and bottom. Alternatively, the compartments may be positioned in a side-by-side orientation, i.e. one orientated next to the other. The compartments may even be orientated in a 'tyre and rim' arrangement, i.e., a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

Wherein the unit dose article comprises at least four compartments, three of the compartments may be smaller than the fourth compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments, or even in all compartments.

Each compartment may comprise the same or different compositions. The different compositions could all be in the same form, or they may be in different forms.

The water-soluble unit dose article may comprise at least two internal compartments, wherein the liquid laundry detergent composition is comprised in at least one of the compartments, preferably wherein the unit dose article comprises at least three or even four compartments, wherein the liquid laundry treatment composition is comprised in at least one of the compartments.

Preferably, the water-soluble unit dose article comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known techniques to determine dioxane levels.

FIG. 1 discloses a water-soluble unit dose article (1) according to the present invention. The water-soluble unit dose article (1) comprises a first water-soluble film (2) and a second water-soluble film (3) which are sealed together at a seal region (4). The laundry treatment composition (5) is comprised within the water-soluble soluble unit dose article (1).

Process of Making

A first aspect of the present invention is a process of making a water-soluble unit dose article. Water-soluble unit dose articles are described in more detail below. The process may be conducted on a belt or a rotary drum, or a mixture thereof.

The process comprises a step;

a. deforming a first water-soluble film to create an open cavity.

The water-soluble film is described in more detail below. The first water-soluble film may be deformed into a mould via thermoforming, vacuum-forming, or a combination thereof. Those skilled in the art will be aware of suitable processes to achieve this.

The process comprises a step;

b. filling the open cavity with a liquid detergent composition.

The liquid detergent composition comprises a cationically modified poly alpha-1,6-glucan ether compound, wherein the cationically modified poly alpha-1,6-glucan ether compound is added to the liquid detergent composition as a premix. The liquid detergent composition is described in more detail below. Those skilled in the art will be aware of known suitable means and apparatus to dose the liquid detergent composition into the open cavity. The dosing means may comprise a reciprocal motion dosing nozzle allowing efficient filling of the open cavity whilst said cavity moves in a machine direction.

Following preparation of the liquid detergent base, the liquid detergent base may be separated into at least a first stream and a second stream, wherein the cationically modified poly alpha-1,6-glucan ether compound is added in the form of a cationically modified poly alpha-1,6-glucan ether compound premix to at least the first stream, and wherein each stream is added to the same or different open cavities of the same or different water-soluble unit dose articles.

The process comprises a step;

c. closing the open cavity with a water-soluble lid, wherein the water-soluble lid comprises a second water-soluble film.

The water-soluble film is described in more detail below.

The process comprises a step;

d. sealing the first water-soluble film and the water-soluble lid together to create the water-soluble unit dose article.

Those skilled in the art will be aware of suitable means to seal the first and second water-soluble films. Sealing may be achieved via solvent sealing, heat sealing, pressure sealing, or a mixture thereof. Suitable solvents include aqueous solvents or non-aqueous solvents. A preferred solvent is water. The solvent may be applied via a felt roll or via a spray or via a mixture thereof.

The solvent composition may comprise water, non-aqueous solvent, or a mixture thereof. The sealing solvent may comprise further adjunct materials including, but not limited to, surfactants and or water-soluble polymers such as polyvinyl alcohol homopolymers and/or polyvinyl alcohol copolymers. Preferably, the sealing solvent comprises at least 90%, more preferably at least 95% by weight of the sealing solvent of water. Most preferably the sealing solvent consists of water. The water may be demineralized water or may comprise water hardness ions and other ions typically found in commune waters. The sealing solvent may be at a temperature of between 15 °C and 25 °C Non-aqueous solvents may comprise propylene glycol, glycerol, 1,2-propanediol, dipropylene glycol, 2-methyl-1,3-propanediol, trimethylolpropane, triethyleneglycol, polyethyleneglycol, sorbitol, monoethanolamine, or a mixture thereof.

The sealing solvent may comprise polymers as adjunct ingredients. Preferably said adjunct polymers are the same polymers as comprised in the water-soluble film.

The process comprises a step;

e. optionally separating the water-soluble unit dose article from neighbouring water-soluble unit dose articles.

Those skilled in the art will be aware of suitable means to separate the water-soluble unit dose article from neighbouring water-soluble unit dose articles. Separation may be in the machine direction, the cross-machine direction, or both. The water-soluble unit dose articles may be separated via a knife, preferably a rotating knife. Alternatively, they may be separated using a laser.

The process may be a continuous process or a batch process, preferably wherein said process is a continuous process.

The water-soluble unit dose articles may be collected into a primary pack. Such a primary pack may comprise plastic, paper-based materials, or a mixture thereof. The primary pack may comprise a plurality of water-soluble unit dose articles, for example at least 10, or even at least 15, or even at least 20, or even at least 25, or even at least 30, or even at least 35 water-soluble unit-dose articles. The primary pack may comprise a child-resistant, or child-impeding closure. Without wishing to be bound by theory, the primary pack is intended to be presented on shelf to potential consumers, and so may comprise relevant instructions and/or branding. The primary pack may be comprised within an outer secondary pack. Such secondary packs are intended for storage, transport and/or display and may also comprise relevant branding.

Liquid Detergent Composition

The term 'liquid detergent composition' refers to any composition, preferably a laundry composition, comprising a liquid capable of wetting and treating a surface, preferably a fabric. and includes, but is not limited to, liquids, gels, pastes, dispersions and the like. The liquid composition can include solids or gases in suitably subdivided form, but the liquid composition excludes forms which are non-fluid overall, such as tablets or granules.

The liquid detergent composition is prepared by the following steps;

i. providing a liquid detergent base, wherein the liquid detergent base comprises one or more detergent actives, one or more organic solvents, or a mixture thereof, and separately providing a cationically modified poly alpha-1,6-glucan ether compound premix.

The detergent actives are described in more detail below. The detergent actives may comprise enzymes, perfumes, surfactants, polymers, dyes, or a mixture thereof. The surfactants may comprise anionic surfactants, non-ionic surfactants, cationic surfactants, amphoteric surfactants, zwitterionic surfactants, or a mixture thereof.

The organic solvents are described in more detail below. The cationically modified poly alpha-1,6-glucan ether compound premix is described in more detail below.

ii. mixing the liquid detergent base and the cationically modified poly alpha-1,6-glucan ether compound premix.

Those skilled in the art will be aware of suitable mixing means. Suitable mixers include static mixers, dynamic mixers, or a combination thereof. Examples of suitable static mixers include the SMX range of static mixers commercially available from Sulzer. Examples of suitable dynamic mixers include include pitch blade mixers, disc turbine mixers or propeller mixers. Such mixers are well known and available from numerous commercial sources.

It is preferred that the cationically modified poly alpha-1,6-glucan ether compound premix is at a temperature of between 15 °C and 60 °C, more preferably between 20 °C and 55 °C ahead of mixing with the liquid detergent base. It is preferred that the liquid detergent base is at a temperature of between 15 °C and 50 °C, more preferably, between 20 °C and 40 °C before mixing with the cationically modified poly alpha-1,6-glucan ether compound premix. Without wishing to be bound theory, controlling the temperature allows for more efficient control of the viscosity during the manufacturing process.

iii. optionally adding one or more further detergent ingredients to the liquid detergent base comprising the cationically modified poly alpha-1,6-glucan ether compound to create a liquid detergent composition.

Those skilled in the art will be aware of suitable further detergent ingredients. The further detergent ingredients may comprise enzymes, perfumes, surfactants, polymers, dyes, or a mixture thereof. Typically, also final pH or viscosity trimming agents or water/solvents to reach 100 parts are added at that stage. The surfactants may comprise anionic surfactants, non-ionic surfactants, cationic surfactants, amphoteric surfactants, zwitterionic surfactants, or a mixture thereof.

The weight ratio of liquid detergent base to cationically modified poly alpha-1,6-glucan ether compound premix is between 70:30 and 99.5:0.5, preferably between 80:20 and 99:1.0, more preferably between 90:10 and 98:2.0.

The detergent ingredients in steps i) and iii) may be selected from surfactants, solvents, chelants, perfumes, dyes, enzymes, (alkoxylated) polyethyleneimines, polysaccharide polymers, polyethylene glycol polymers, hueing dyes, polymers, builders, dye transfer inhibiting agents, dispersants, enzyme stabilizers, catalytic materials, bleach, bleach activators, polymeric dispersing agents, anti-redeposition agents, suds suppressors, aesthetic dyes, opacifiers, perfumes, perfume delivery systems, structurants, hydrotropes, processing aids, pigments, amphoteric surfactants, cyclic diamines, zwitterionic polyamines, anti-oxidants, preservatives, pH or viscosity trimming agents, extra water and mixtures thereof.

Preferably, the liquid detergent composition according to the invention, or any ingredients therein, each individually comprise between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppm and 100 ppb dioxane, most preferably 0 ppm dioxane. Those skilled in the art will be aware of known methods and techniques to determine the dioxane level within the liquid detergent compositions Preferably, the liquid detergent composition comprises between 1% and 20%, preferably between 5% and 15% by weight of the liquid detergent composition of water.

Preferably, the liquid detergent composition may comprise a non-soap surfactant, wherein the non-soap surfactant preferably comprises anionic surfactant, non-ionic surfactant, cationic surfactant, amphoteric surfactant, zwitterionic surfactant, or a mixture thereof, preferably wherein the liquid detergent composition comprises between 20% and 60%, preferably between 25% and 55%, more preferably between 30% and 50% by weight of the liquid detergent composition of the non-soap surfactant.

Preferably the non-soap surfactant comprises a non-soap anionic surfactant. Preferably the laundry detergent composition comprises between 10% and 50%, between 15% and 45%, between 20% and 40%, or between 30% and 40% by weight of the liquid detergent composition of the non-soap anionic surfactant.

Preferably, the non-soap anionic surfactant comprises linear alkylbenzene sulphonate. Preferably, the linear alkylbenzene sulphonate comprises $C_{10}$-$C_{16}$ alkyl benzene sulfonate, $C_{11}$-$C_{14}$ alkyl benzene sulphonate or a mixture thereof. Preferably, the alkylbenzene sulphonate is an amine neutralized alkylbenzene sulphonate, an alkali metal neutralized alkylbenzene sulphonate or a mixture thereof. The amine is preferably selected from monoethanolamine, triethanolamine or mixtures thereof. The alkali metal is preferably selected from sodium, potassium, magnesium or a mixture thereof. Preferably, the liquid detergent composition comprises between 5% and 40%, preferably between 10% and 35%, more preferably between 15% and 30% by weight of the liquid detergent composition of the linear alkylbenzene sulphonate anionic surfactant.

Preferably, the non-soap anionic surfactant comprises an alkyl sulphate anionic surfactant wherein the alkyl sulphate anionic surfactant is selected from alkyl sulphate, an alkoxylated alkyl sulphate or a mixture thereof. The alkyl sulphate anionic surfactant may be a primary or a secondary alkyl sulphate anionic surfactant, or a mixture thereof, preferably a primary alkyl sulphate anionic surfactant. Preferably, the alkoxylated alkyl sulphate comprises ethoxylated alkyl sulphate, propoxylated alkyl sulphate, a mixed ethoxylated/propoxylated alkyl sulphate, or a mixture thereof, more preferably an ethoxylated alkyl sulphate. Preferably, the ethoxylated alkyl sulphate has an average degree of ethoxylation of between 0.1 to 5, preferably between 0.5 and 3. Preferably, the ethoxylated alkyl sulphate has an average alkyl chain length of between 8 and 18, more preferably between 10 and 16, most preferably between 12 and 15. Preferably, the alkyl chain of the alkyl sulphate anionic surfactant is linear, branched or a mixture thereof. Preferably, the branched alkyl sulphate anionic surfactant is a branched primary alkyl sulphate, a branched secondary alkyl sulphate, or a mixture thereof, preferably a branched primary alkyl sulphate, wherein the branching preferably is in the 2-position, or alternatively might be present further down the alkyl chain, or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, Fischer-Tropsch-synthesized material, iso-alkyl synthesized material, or mixtures thereof, preferably oxo-synthesized material. Preferably, the liquid laundry detergent composition comprises between 1% and 35%, preferably between 3% and 30%, more preferably between 6% and 20% by weight of the liquid detergent composition of the alkyl sulphate anionic surfactant.

Preferably, the non-soap anionic surfactant comprises linear alkyl benzene sulphonate and an alkoxylated alkyl sulphate and wherein the weight ratio of linear alkylbenzene sulphonate to alkoxylated alkyl sulphate is from 1:2 to 9:1, preferably from 1:1 to 7:1, more preferably from 1:1 to 5:1, most preferably from 1:1 to 4:1. Without wishing to be bound by theory formulating these anionic surfactant ratios provide the benefit of providing excellent stain removal and cleaning across a broad range of stains.

Preferably, the non-soap surfactant comprises a non-ionic surfactant, wherein the non-ionic surfactant preferably comprises an alkoxylated alcohol, wherein the alkoxylated alcohol is derived from a synthetical alcohol, a natural alcohol or a mixture thereof. The alkoxylated alcohol can be a primary alkoxylated alcohol, a secondary alkoxylated alcohol, or a mixture thereof, preferably a primary alkoxylated alcohol. Preferably, the alkoxylated alcohol comprises ethoxylated alcohol, propoxylated alcohol, a mixed ethoxylated/propoxylated alcohol, or a mixture thereof, more preferably an ethoxylated alcohol. Alternatively, the alkoxylated alcohol might also include higher alkoxy groups such as butoxy groups. When mixed alkoxy groups, the alkoxy groups can be randomly ordered or present in blocks, preferably are present in blocks. For example, mixed ethoxy (EO)/propoxy (PO) groups might be ordered in EO/PO blocks, PO/EO blocks, EO/PO/EO blocks or PO/EO/PO blocks. Preferably, the ethoxylated alcohol has an average degree of ethoxylation of between 0.1 to 20, preferably between 5 and 15, most preferably between 6 and 10. If propoxylation is present, preferably the average degree of propoxylation is between 0.1 to 25, more preferably between 2 and 20, most preferably between 5 and 10. Preferably, the alkoxylated preferably ethoxylated alcohol has an average alkyl chain length of between 8 and 18, more preferably between 10 and 16, most preferably 12 and 15. Preferably, the alkyl chain of the alkoxylated alcohol is linear, branched or a mixture thereof, wherein the branched alkyloxylated alcohol is a branched primary alkoxylated alcohol, a branched secondary alkoxylated alcohol, or a mixture thereof, preferably a branched primary alkoxylated alcohol. Preferably, the weight average degree of branching of the alkoxylated alcohol is from 0% to 100% preferably from 0% to 95%, more preferably 0% to 60%, most preferably from 0% to 20%. The branching can be on the 2-alkyl position, or alternatively further down the alkyl chain, or can be multi-branched with individual branches spread over the alkyl chain. Preferably, the synthetically derived material comprises oxo-synthesized material, Ziegler-synthesized material, Guerbet-synthesized material, Fischer-Tropsch-synthesized material, iso-alkyl branched materials, or mixtures thereof, preferably oxo-synthesised material. Preferably, the liquid laundry detergent composition comprises between 0.5% and 20%, preferably between 1% and 15%, more preferably between 3% and 12% by weight of the liquid laundry detergent composition of the non-ionic surfactant, preferably wherein the nonionic surfactant consists of the alkoxylated alcohol. Without wishing to be bound by theory, non-ionic surfactants, especially alkoxylated alcohol non-ionic surfactants provide the benefit of excellent body soil cleaning and soil suspension. Preferably the liquid detergent composition comprises between 0.01% and 10%, between 0.01% and 8%, between 0.1% and 6%, or between 0.15% and 5% by weight of the liquid laundry treatment composition of a non-ionic surfactant.

Preferably, the weight ratio of non-soap anionic surfactant to nonionic surfactant is from 1:1 to 20:1, from 1.5:1 to 17.5:1, from 2:1 to 15:1, or from 2.5:1 to 13:1.

Preferably, the liquid detergent composition comprises a fatty acid, preferably a neutralized fatty acid soap, more preferably. Preferably, the liquid detergent composition comprises between 1.5% and 20%, more preferably between 2% and 15%, even more preferably between 3% and 10%, or most preferably between 4% and 8% by weight of the liquid detergent composition of fatty acid. Preferably, the fatty acid may be branched or linear, alkoxylated or non-alkoxylated and preferably is selected from palm kernel fatty acid, coconut fatty acid, rapeseed fatty acid, neutralized palm kernel fatty acid, neutralized coconut fatty acid, neutralized rapeseed fatty acid, or mixture thereof, most preferably a neutralized palm kernel fatty acid. Preferably, the fatty acid soap is neutralised with an alkali metal, an amine, or a mixture thereof. Preferably, the amine is selected from monoethanolamine, triethanolamine or mixtures thereof and the alkali metal is selected from sodium, potassium, magnesium or a mixture thereof. Without wishing to be bound by theory, fatty acid, preferably neutralized fatty acids, provide the benefit of protecting anionic non-soap surfactant from precipitation. Furthermore, they provide the benefit of clay soil removal and body soil cleaning on fabrics.

Preferably, the liquid laundry treatment composition comprises perfume raw material. The perfume raw material may comprise a perfume raw material selected from the group consisting of perfume raw materials having a boiling point (B.P.) lower than 250 °C and a ClogP lower than 3, perfume raw materials having a B.P. of greater than 250 °C and a ClogP of greater than 3, perfume raw materials having a B.P. of greater than 250 °C and a ClogP lower than 3, perfume raw materials having a B.P. lower than 250 °C and a ClogP greater than 3 and mixtures thereof. Perfume raw materials having a boiling point B.P. lower than 250 °C and a ClogP lower than 3 are known as Quadrant I perfume raw materials. Quadrant 1 perfume raw materials are preferably limited to less than 30% of the perfume composition. Perfume raw materials having a B.P. of greater than 250 °C and a ClogP of greater than 3 are known as Quadrant IV perfume raw materials, perfume raw materials having a B.P. of greater than 250 °C and a ClogP lower than 3 are known as Quadrant II perfume raw materials, perfume raw materials having a B.P. lower than 250 °C and a ClogP greater than 3 are known as a Quadrant III perfume raw materials.

Preferred perfume raw material classes include ketones and aldehydes. Those skilled in the art will know how to formulate an appropriate perfume raw material.

The one or more organic solvents in the liquid detergent base may comprise ethanol, ethylene glycol, polyethylene glycol, 1,2-propanediol, dipropylene glycol, tripropyleneglycol, polypropylene glycol, glycerol, or a mixture thereof, preferably, wherein the non-aqueous solvent comprises 1,2-propanediol.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution.

The liquid laundry detergent composition described herein can have any suitable viscosity depending on factors such as formulated ingredients and purpose of the composition. When Newtonian the composition may have a viscosity value, at a shear rate of 20 $s^{-1}$ and a temperature of 20 °C, of 100 to 3,000 cP, alternatively 200 to 2,000 cP, alternatively 300 to 1,000 cP, following the method described herein. When non-Newtonian, the composition may have a high shear viscosity value, at a shear rate of 20 $s^{-1}$ and a temperature of 20 °C, of 100 to 3,000 cP, alternatively 300 to 2,000 cP, alternatively 500 to 1,000 cP, and a low shear viscosity value, at a shear rate of 1 $s^{-1}$ and a temperature of 20 °C, of 500 to 100,000 cP, alternatively 1000 to 10,000 cP, alternatively 1,300 to 5,000 cP, following the method described herein.

Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20 °C, a pre-shear of 10 seconds at a shear rate of 10 $s^{-1}$, and an equilibration of 60 seconds at the selected temperature. The peak hold involves applying a shear rate of 0.05 $s^{-1}$ at 20 °C for 3 min with sampling every 10 s. The continuous ramp step is performed at a shear rate from 0.1 to 1200 $s^{-1}$ for 3 min at 20 °C to obtain the full flow profile.

Cationically Modified Poly Alpha-1,6-Glucan Ether Compound Premix

The cationically modified poly alpha-1,6-glucan ether compound premix comprises;

from 20% to 50% or from 25% to 40%, or from 30% to 35% by weight of the premix of the cationically modified poly alpha-1,6-glucan ether compound;

from 15 to 75%, or from 20% to 70%, or from 25% to 50%, or from 30% to 40% by weight of one or more organic solvents;

less than 50%, preferably less than 45%, preferably less than 40%, more preferably less than 35%, or even from 10% to 35%, or even from 30% to 35% by weight of water.

The cationically modified poly alpha-1,6-glucan ether is described in more detail below.

The one or more organic solvent in the cationically modified poly alpha-1,6-glucan ether compound premix may comprise ethanol, ethylene glycol, polyethylene glycol, 1,2-propanediol, dipropylene glycol, tripropyleneglycol, polypropylene glycol, glycerol, or a mixture thereof, preferably, wherein the non-aqueous solvent comprises 1,2-propanediol.

A preferred process for making a cationically modified poly alpha-1,6-glucan ether compound premix comprises the steps of;

a. mixing the cationically modified poly alpha-1,6-glucan ether compound in solid form and the one or more organic solvents to create the poly alpha-1,6-glucan ether compound premix; or b. mixing the cationically modified poly alpha-1,6-glucan ether compound in solid form or liquid form and the one or more organic solvents to create a poly alpha-1,6-glucan ether compound intermediate, then removing the solvents to create a concentrated a poly alpha-1,6-glucan ether compound premix. Optionally, a viscosity adjusting agent may be added to the poly alpha-1,6-glucan ether compound premix to control the viscosity of the premix. Suitable viscosity adjusting agents will be known to those skilled in the art. A preferred viscosity adjusting agent is hydrogenated castor oil.

Those skilled in the art will be aware of suitable mixing means. Suitable mixers include static mixers, dynamic mixers or a combination thereof. Examples of suitable static mixers include the SMX range of static mixers commercially available from Sulzer. Examples of suitable dynamic mixers include include pitch blade mixers, disc turbine mixers or propeller mixers. Such mixers are well known and available from numerous commercial sources.

The mixing process mentioned above may comprises one or more steps. The cationically modified poly alpha-1,6-glucan, and the one or more organic solvent maybe mixed follow certain order of addition. For example, the cationically modified poly alpha-1,6-glucan ether compound in solid form maybe mixed with one organic solvent first to form an intermediate, then the intermediate is mixed with a different organic solvent.

Cationically Modified Poly Alpha-1,6-Glucan Ether

The cationically modified poly alpha-1,6-glucan ether compound comprises a poly alpha-1,6-glucan backbone substituted with at least one positively charged organic group, wherein the poly alpha-1,6-glucan backbone has at least 65% of the glucose monomer units linked via alpha-1,6-glycosidic linkages, and wherein the poly alpha-1,6-glucan ether compound has an average degree of substitution of from 0.001 to 3, preferably from 0.01 to 1.5, more preferably from 0.01 to 1.0, even more preferably from 0.01 to 0.8, most preferably from 0.03 to 0.7, or from 0.04 to 0.6, or from 0.05 to 0.5; and is characterised by at least one of the following i-iv;

i) a weight average degree of polymerization of at least 5, preferably from 5 to 6000, more preferably from 50 to 5000, or from 100 to 4000, or from 250 to 3000, or from 500 to 2000, or from 750 to 1500, or from 1000 to 1400, or from 1100 to 1300;

ii) a weight average molecular weight of from 1000 to 500,000 Daltons, preferably from 10,000 to 400,000 Daltons, or from 40,000 to 300,000 Daltons, or from 80,000 to 300,000 Daltons or from 100,000 to 250,000 Daltons, or from 150,000 to 250,000 Daltons, or from 180,000 to 225,000 Daltons, or from 180,000 to 200,000 Daltons;

iii) been derived from a poly alpha-1,6-glucan having a weight average molecular weight of from 900 to 450,000 Daltons, preferably from 10,000 to 350,000 Daltons, or from 50,000 to 350,000 Daltons, or from 90,000 to 300,000 Daltons, or from 125,000 to 250,000 Daltons, or from 150,000 to 200,000 Daltons, determined prior to substitution with the least one positively charged organic group;

iv) a mixture thereof.

As used herein, the term "polysaccharide" means a polymeric carbohydrate molecule composed of long chains of monosaccharide units bound together by glycosidic linkages and on hydrolysis gives the constituent monosaccharides or oligosaccharides.

The term "polysaccharide derivative" as used herein means a chemically modified polysaccharide in which at least one or some of the hydroxyl groups of the glucose monomer units have been replaced with one or more ether groups. As used herein, the term "polysaccharide derivative" is used interchangeably with "poly alpha-1,6-glucan ether" and "poly alpha-1,6-glucan ether compound".

The term "hydrophobic" refers to a molecule or substituent which is nonpolar and has little or no affinity for water, and which tends to repel water.

The term "hydrophilic" refers to a molecule or a substituent which is polar and has affinity to interact with polar solvents, in particular with water, or with other polar groups. A hydrophilic molecule or substituent tends to attract water.

The "molecular weight" of a poly alpha-1,6-glucan or poly alpha-1,6-glucan ether can be represented as statistically averaged molecular mass distribution, i.e. as number-average molecular weight ($M_n$) or as weight-average molecular weight ($M_w$), both of which are generally given in units of Daltons (Da), i.e. in grams/mole. Alternatively, molecular weight can be represented as DPw (weight average degree of polymerization) or DPn (number average degree of polymerization). Various means are known in the art for calculating these molecular weights from techniques such as high-pressure liquid chromatography (HPLC), size exclusion chromatography (SEC), gel permeation chromatography (GPC), and gel filtration chromatography (GFC).

As used herein, "weight average molecular weight" or "$M_w$" is calculated as $M_w=\Sigma N_i M_i^2/\Sigma N_i M_i$; where $M_i$ is the molecular weight of an individual chain i and $N_i$ is the number of chains of that molecular weight. In addition to using SEC, the weight average molecular weight can be determined by other techniques such as static light scattering, mass spectrometry especially MALDI-TOF (matrix-assisted laser desorption/ionization time-of-flight), small angle X-ray or neutron scattering, and ultracentrifugation.

As used herein, "number average molecular weight" or "$M_n$" refers to the statistical average molecular weight of all the polymer chains in a sample. The number average molecular weight is calculated as $M_n=\Sigma N_i M_i/\Sigma N_i$ where $M_i$ is the molecular weight of a chain i and $N_i$ is the number of chains of that molecular weight. In addition to using SEC, the number average molecular weight of a polymer can be determined by various colligative methods such as vapor pressure osmometry or end-group determination by spectroscopic methods such as proton NMR, FTIR, or UV-vis.

As used herein, number average degree of polymerization (DPn) and weight average degree of polymerization (DPw) are calculated from the corresponding average molecular weights Mw or Mn by dividing by the molar mass of one monomer unit $M_1$. In the case of unsubstituted glucan polymer, $M_1=162$. In the case of a substituted glucan polymer, $M_1=162+M_f \times DoS$, where $M_f$ is the molar mass of the substituent group and DoS is the degree of substitution with respect to that substituent group (average number of substituted groups per one glucose unit).

Glucose carbon positions 1, 2, 3, 4, 5 and 6 as referred to herein are as known in the art and depicted in Structure I:

Structure I

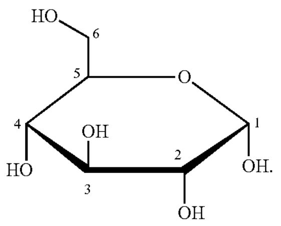

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings. The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose".

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}C$ NMR or $^{1}H$ NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The structure, molecular weight, and average degree of substitution of a polysaccharide or polysaccharide derivative can be confirmed using various physiochemical analyses known in the art such as NMR spectroscopy and size exclusion chromatography (SEC).

The term "alkyl group", as used herein, refers to linear, branched, aralkyl (such as benzyl), or cyclic ("cycloalkyl") hydrocarbon groups containing no unsaturation. As used herein, the term "alkyl group" encompasses substituted alkyls, for example alkyl groups substituted with at least one hydroxyalkyl group or dihydroxy alkyl group, as well as alkyl groups containing one or more heteroatoms such as oxygen, sulfur, and/or nitrogen within the hydrocarbon chain.

As used herein, the term "aryl" means an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups. By aryl is also meant heteroaryl groups where heteroaryl is defined as 5-, 6-, or 7-membered aromatic ring systems having at least one hetero atom selected from the group consisting of nitrogen, oxygen and sulfur. Examples of heteroaryl groups include pyridyl, pyrimidinyl, pyrrolyl, pyrazolyl, pyrazinyl, pyridazinyl, oxazolyl, furanyl, imidazole, quinolinyl, isoquinolinyl, thiazolyl, and thienyl, which can optionally be substituted with alkyl groups.

The poly alpha-1,6-glucan ether compound comprises a poly alpha-1,6-glucan substituted with at least one positively charged organic group, where the poly alpha-1,6-glucan backbone has at least 65% of the glucose monomer units linked via alpha-1,6-glycosidic linkages. The poly alpha-1,6-glucan ether compound may be characterized by (a) a weight average degree of polymerization of at least 5; (b) a weight average molecular weight of from 1000 to 500,000 daltons; and/or (c) having been derived from a poly alpha-1,6-glucan having a weight average molecular weight of from 900 to 450,000 daltons, determined prior to substitution with the least one positively charged organic group. The poly alpha-1,6-glucan ether compound may be characterized by an average degree of substitution of 0.001 to 3.0. Optionally, at least 3%, preferably from 5% to 50%, more preferably, from 5% to 35%, of the backbone glucose monomer units have branches via alpha-1,2 and/or alpha-1,3-glycosidic linkages. These compounds, groups, and properties are described in more detail below.

The poly alpha-1,6-glucan ether compounds disclosed herein comprise poly alpha-1,6-glucan substituted with at least one positively charged organic group, wherein the organic group or groups are independently linked to the poly alpha-1,6-glucan polysaccharide backbone and/or to any branches, if present, through an ether (—O—) linkage. The at least one positively charged organic group can derivatize the poly alpha-1,6-glucan at the 2, 3, and/or 4 glucose carbon position(s) of a glucose monomer on the backbone of the poly alpha-1,6-glucan ether compound and/or at the 1, 2, 3, 4, or 6 glucose carbon position(s) of a glucose monomer on a branch, if present. At unsubstituted positions a hydroxyl group is present in a glucose monomer.

The poly alpha-1,6-glucan ether compounds disclosed herein are referred to as "cationic" ether compounds due to the presence of one or more positively charged organic groups. The terms "positively charged organic group", "positively charged ionic group", and "cationic group" are used interchangeably herein. A positively charged group comprises a cation (a positively charged ion). Examples of positively charged groups include substituted ammonium groups, carbocation groups, and acyl cation groups.

The cationic poly alpha-1,6-glucan ether compounds disclosed herein comprise water-soluble poly alpha-1,6-glucan ether compounds comprising a backbone of glucose monomer units wherein at least 65% of the glucose monomer units are linked via alpha-1,6-glycosidic linkages, and optionally at least 5% of the backbone glucose monomer units have branches via alpha-1,2 and/or alpha-1,3-glycosidic linkages. The poly alpha-1,6-glucan is substituted with positively charged organic groups on the polysaccharide backbone and/or on any branches which may be present, such that the poly alpha-1,6-glucan ether compound comprises unsubstituted and substituted alpha-D-glucose rings. The poly alpha-1,6-glucan ether compound may be randomly substituted with positively charged organic groups. As used herein, the term "randomly substituted" means the substituents on the glucose rings in the randomly substituted polysaccharide occur in a non-repeating or random fashion. That is, the substitution on a substituted glucose ring may be the same or different (i.e. the substituents, which may be the same or different, on different atoms in the glucose rings in the polysaccharide) from the substitution on a second substituted glucose ring in the polysaccharide, such that the overall substitution on the polymer has no pattern. Further, the substituted glucose rings may occur randomly within the polysaccharide (i.e., there is no pattern with the substituted and unsubstituted glucose rings within the polysaccharide).

Depending on reaction conditions and the specific substituent used to derivatize the poly alpha-1,6-glucan ether compound, the glucose monomers of the polymer backbone may be disproportionately substituted relative to the glucose monomers of any branches, including branches via alpha-1,2 and/or alpha-1,3 linkages, if present. The glucose monomers of the branches, including branches via alpha-1,2 and/or alpha-1,3 linkages, if present, may be disproportionately substituted relative to the glucose monomers of the polymer backbone. Depending on reaction conditions and the specific substituent used, substitution of the poly alpha-1,6-glucan ether compound may occur in a block manner.

Depending on reaction conditions and the specific substituent used to derivatize the poly alpha-1,6-glucan ether compound, it is possible that the hydroxyl groups at certain glucose carbon positions may be disproportionately substituted. For example, the hydroxyl at carbon position 6 for a branched unit may be more substituted than the hydroxyls at other carbon positions. The hydroxyl at carbon position 2, 3, or 4 may be more substituted than the hydroxyls at other carbon positions.

The poly alpha-1,6-glucan ether compounds disclosed herein contain positively charged organic groups and are of interest due to their solubility characteristics in water, which can be varied by appropriate selection of substituents and the degree of substitution. Compositions comprising the poly alpha-1,6-glucan ether compounds can be useful in a wide range of applications, including laundry, cleaning, food, cosmetics, industrial, film, and paper production. Poly alpha-1,6-glucan ether compounds having greater than 0.1 weight percent (wt %) solubility in water can be useful as rheology modifiers, emulsion stabilizers, and dispersing agents in cleaning, detergent, cosmetics, food, cement, film, and paper production, wherein the products are in a primarily water based formulation and optical clarity is desired. Poly alpha-1,6-glucan ether compounds having less than 0.1 wt % solubility in water can be useful as rheology modifiers, emulsion stabilizers, and dispersing agents in cleaning, detergent, cosmetics, food, cement, film, and paper production, wherein the products are in formulations which contain organic solvents to solubilize or disperse the poly alpha-1,6-glucan derivatives. The poly alpha-1,6-glucan ether compound may have an average DoS of from 0.001 to 1.5 and a solubility of 0.1% by weight or higher in deionized water at 25 °C The poly alpha-1,6-glucan ether compound may have an average DoS of from 0.05 to 1.5 and a solubility of less than 0.1% by weight in pH 7 water at 25 °C. Poly alpha-1,6-glucan ether compounds having a solubility of at least 0.1%, or at least 1%, or at least 10%, or at least 25%, or at least 50%, or at least 75%, or at least 90%, by weight, in deionized water at 25 °C may be preferred for use in fabric care or dish care compositions, due to case of processing and/or increased solubility in aqueous end-use conditions.

The cationic poly alpha-1,6-glucan ether compounds disclosed herein can be comprised in a water soluble unit dose fabric care composition in an effective amount, for example an amount that provides a desired degree of one or more of the following physical properties to the product or to the end-use: thickening, freeze/thaw stability, lubricity, moisture retention and release, texture, consistency, shape retention, emulsification, binding, suspension, dispersion, and/or gelation. Effective amounts may also be selected to provide treatment benefits in the desired end-use of the composition, for example deposition benefits, freshness benefits, softness or other conditioning benefits, color benefits, stain removal benefits, whiteness or anti-graying benefits.

Preferably, the treatment composition comprises from 0.01% to 10%, or from 0.1% to 5%, or from 0.3% to 3%, or from 0.5% to 2.0%, by weight of the treatment composition, of the poly alpha-1,6-glucan ether compound.

The poly alpha-1,6-glucan ether compounds of the present disclosure comprise a substituted poly alpha-1,6-glucan ether compound, and are typically made from a poly alpha-1,6-glucan starting material. The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1,3-linkage (loan et al., *Macromolecules* 33:5730-5739) or alpha-1,2-linkage. Production of dextrans is typically done through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Poly alpha-1,6-glucan can be prepared using glucosyltransferases such as (but not limited to) GTF1729, GTF1428, GTF5604, GTF6831, GTF8845, GTF0088, and GTF8117 as described in WO2015/183714 and WO2017/091533, both of which are incorporated herein by reference.

The cationic poly alpha-1,6-glucan ether compound may comprise a backbone of glucose monomer units wherein greater than or equal to 40% of the glucose monomer units are linked via alpha-1,6-glycosodic linkages, for example greater than or equal to 40%, 45%, 50%, 55%, 60%, 65%, 70%, 75%, 80%, 90%, or 95% of the glucose monomer units. The backbone of the cationic poly alpha-1,6-glucan ether compound can comprise at least 3%, 5%, 10%, 15%, 20%, 25%, 30%, 35%, 40%, 45%, 50%, 55%, or 60% glucose monomer units which are linked via alpha-1,2, alpha-1,3, and/or alpha-1,4 glycosidic linkages. The cationic poly alpha-1,6-glucan ether compound may comprise a backbone of glucose monomer units wherein at least 65% of the glucose monomer units are linked via alpha-1,6-glycosidic linkages. The cationic poly alpha-1,6-glucan ether compound may comprise a backbone of glucose monomer units wherein at least 70% of the glucose monomer units are linked via alpha-1,6-glycosidic linkages. The cationic poly alpha-1,6-glucan ether compound may comprise a backbone of glucose monomer units wherein at least 80% of the glucose monomer units are linked via alpha-1,6-glycosidic linkages. The cationic poly alpha-1,6-glucan ether compound may comprise a backbone of glucose monomer units wherein at least 90% of the glucose monomer units are linked via alpha-1,6-glycosidic linkages. The cationic poly alpha-1,6-glucan ether compound may comprise a backbone of glucose monomer units wherein at least 95% of the glucose monomer units are linked via alpha-1,6-glycosidic linkages. The cationic poly alpha-1,6-glucan ether compound may comprise a backbone of glucose monomer units wherein at least 99.5% of the glucose monomer units are linked via alpha-1,6-glycosidic linkages. The poly alpha-1,6-glucan ether compound may be predominantly linear.

Dextran "long chains" can comprise "substantially (or mostly) alpha-1,6-glucosidic linkages", meaning that they can have at least 98.0% alpha-1,6-glucosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (e.g., measured by DP/degree of polymerization) of at least 70% of all the long chains in a branching structure is within plus/minus 30% of the mean length of all the long chains of the branching structure.

Dextran may further comprise "short chains" branching from the polysaccharide backbone, the branches typically being one to three glucose monomers in length, and typically comprising less than 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). The amount of alpha-1,2-branching or alpha-1,3-branching can be determined by NMR methods, as disclosed in the Test Methods.

Dextran can be produced enzymatically prior to being modified with alpha-1,2 or alpha-1,3 branches. In certain embodiments, dextran can be synthesized using a dextransucrase and/or methodology as disclosed in WO 2015/183714 or WO 2017/091533 or published application US 2018/0282385, which are all incorporated herein by reference. The dextransucrase identified as GTF8117, GTF6831, or GTF5604 in these references can be used, if desired (or any dextransucrase comprising an amino acid sequence that is at least 90%, 91%, 92%, 93%, 94%, 95%, 96%, 97%, 98%, or 99% identical to any of these particular dextransucrases). Such enzymatically produced dextran is linear (i.e. 100% alpha-1,6-linkages) and aqueous soluble.

The poly-1,6-glucan with branching can be produced enzymatically according to the procedures in WO 2015/

183714 and WO 2017/091533 where, for example, alpha-1,2-branching enzymes such as "gtfJ18T1" or "GTF9905" can be added during or after the production of the dextran polymer (polysaccharide). It may be that any other enzyme known to produce alpha-1,2-branching can be added. For example, poly-1,6-glucan with alpha-1,3-branching can be prepared as disclosed in Vuillemin et al. (2016, *J. Biol Chem.* 291:7687-7702) or U.S. Appl. No. 62/871,796, which are incorporated herein by reference. The degree of branching of poly alpha-1,6-glucan or its derivative has less than or equal to 50%, 40%, 30%, 20%, 10%, or 5% (or any value between 5% and 50%) of short branching, for example alpha-1,2-branching, 1,3-branching, or both alpha-1,2-branching and alpha-1,3-branching. The degree of branching in a poly alpha-1,6-glucan starting material is maintained in a branched poly alpha-1,6-glucan ether formed by etherification of the branched poly alpha-1,6-glucan. The amount of alpha-1,2-branching or alpha-1,3-branching can be determined by NMR methods, as disclosed in the Test Methods below.

Without wishing to be bound by theory, it is believed that branching can increase the solubility of the poly alpha-1,6-glucan ether compound, which can lead to more convenient processability and/or transport. It is also believed that limits on the degree of branching can lead to improved performance in the final treatment composition.

A poly alpha-1,6-glucan ether compound may have a degree of alpha-1,2-branching that is less than 50%. A poly alpha-1,6-glucan ether compound may have a degree of alpha-1,2-branching that is at least 5%. From 5% to 50% of the backbone glucose monomer units of a poly alpha-1,6-glucan ether compound may have branches via alpha-1,2 or alpha-1,3 glycosidic linkages. From 5% to 35% of the backbone glucose monomer units of a poly alpha-1,6-glucan ether compound may have branches via alpha-1,2 or alpha-1,3 glycosidic linkages.

At least 3%, preferably at least 5% of the backbone glucose monomer units of a poly alpha-1,6-glucan ether compound may have branches via alpha-1,2- or alpha-1,3-glycosidic linkages. A poly alpha-1,6-glucan ether compound may comprise a backbone of glucose monomer units wherein greater than or equal to 65% of the glucose monomer units are linked via alpha-1,6-glycosidic linkages. A poly alpha-1,6-glucan ether compound may comprise a backbone of glucose monomer units wherein greater than or equal to 65% of the glucose monomer units are linked via alpha-1,6-glycosidic linkages and at least 3%, preferably at least 5%, preferably from 5% to 30%, more preferably from 5% to 25%, even more preferably from 5% to 20%, of the glucose monomer units have branches via alpha-1,2- or alpha-1,3-glycosidic linkages. A poly alpha-1,6-glucan ether compound may comprise a backbone of glucose monomer units wherein greater than or equal to 65% of the glucose monomer units are linked via alpha-1,6-glycosidic linkages and at least 5% of the glucose monomer units have branches via alpha-1,2 linkages. A poly alpha-1,6-glucan ether compound may comprise a backbone of glucose monomer units wherein greater than or equal to 65% of the glucose monomer units are linked via alpha-1,6-glycosidic linkages and at least 5% of the glucose monomer units have branches via alpha-1,3 linkages. A poly alpha-1,6-glucan ether compound may comprise a backbone of glucose monomer units wherein greater than or equal to 65% of the glucose monomer units are linked via alpha-1,6-glycosidic linkages and from 5% to 50% of the glucose monomer units have branches via alpha-1,2- or alpha-1,3-glycosidic linkages. A poly alpha-1,6-glucan ether compound may comprise a backbone of glucose monomer units wherein greater than or equal to 70% of the glucose monomer units are linked via alpha-1,6-glycosidic linkages and from 5% to 35% of the glucose monomer units have branches via alpha-1,2- or alpha-1,3-glycosidic linkages.

A poly alpha-1,6-glucan ether compound may comprise a backbone of glucose monomer units wherein greater than or equal to 90% of the glucose monomer units are linked via alpha-1,6-glycosidic linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,2- or alpha-1,3-glycosidic linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,2 linkages. A poly alpha-1,6-glucan ether compound may comprise a backbone of glucose monomer units wherein greater than or equal to 90% of the glucose monomer units are linked via alpha-1,6-glycosidic linkages and at least 5% of the glucose monomer units have branches via alpha-1,3 linkages. A poly alpha-1,6-glucan ether compound may comprise a backbone of glucose monomer units wherein greater than or equal to 90% of the glucose monomer units are linked via alpha-1,6-glycosidic linkages and from 5% to 50% of the glucose monomer units have branches via alpha-1,2- or alpha-1,3-glycosidic linkages. A poly alpha-1,6-glucan ether compound may comprise a backbone of glucose monomer units wherein greater than or equal to 90% of the glucose monomer units are linked via alpha-1,6-glycosidic linkages and from 5% to 35% of the glucose monomer units have branches via alpha-1,2- or alpha-1,3-glycosidic linkages.

The poly alpha-1,6-glucan and poly alpha-1,6-glucan ether compounds disclosed herein can have a number average degree of polymerization (DPn) in the range of from 5 to 6000. The DPn can be in the range of from 5 to 100, or from 5 to 500, or from 5 to 1000, or from 5 to 1500, or from 5 to 2000, or from 5 to 2500, or from 5 to 3000, or from 5 to 4000, or from 5 to 5000, or from 5 to 6000. The DPn can be in the range of from 50 to 500, or from 50 to 1000, or from 50 to 1500, or from 50 to 2000, or from 50 to 3000, or from 50 to 4000, or from 50 to 5000, or from 50 to 6000.

The poly alpha-1,6-glucan and poly alpha-1,6-glucan ether compounds disclosed herein can have a weight average degree of polymerization (DPw) in the range of at least 5. The DPw can be in the range of from 5 to 6000, or from 50 to 5000, or from 100 to 4000, or from 250 to 3000, or from 500 to 2000, or from 750 to 1500, or from 1000 to 1400, or from 1100 to 1300. The DPw can be in the range of from 400 to 6000, or from 400 to 5000, or from 400 to 4000, or from 400 to 3000, or from 400 to 2000, or from 400 to 1500.

The poly alpha-1,6-glucan ether compounds disclosed herein can have a weight average molecular weight of from 1000 to 500,000 Daltons, or from 10,000 to 400,000 Daltons, or from 40,000 to 300,000 Daltons, or from 80,000 to 300,000 Daltons, or from 100,000 to 250,000 Daltons, or from 150,000 to 250,000 Daltons, or from 180,000 to 225,000 Daltons, or from 180,000 to 200,000 Daltons. It may be that differently sized polymers may be preferred for different applications and/or intended benefits.

The poly alpha-1,6-glucan ether compounds disclosed herein can be derived from a poly alpha-1,6-glucan having a weight average molecular weight of from 900 to 450,000 Daltons, determined prior to substitution with the least one positively charged organic group. The poly alpha-1,6-glucan ether compounds disclosed herein can be derived from a poly alpha-1,6-glucan having a weight average molecular weight of from 5000 to 400,000 Daltons, or from 10,000 to 350,000 Daltons, or from 50,000 to 350,000 Daltons, or from 90,000 to 300,000 Daltons, or from 125,000 to 250,000 Daltons, or from 150,000 to 200,000 Daltons. Differently sized feedstock or backbone polymers may be preferred for different applications, or depending on the intended degree of substitution.

The term "degree of substitution" (DoS) as used herein refers to the average number of hydroxyl groups substituted in each monomeric unit (glucose) of a cationic poly alpha-1,6-glucan ether compound, which includes the monomeric units within the backbone and within any alpha-1,2 or alpha-1,3 branches which may be present. Since there are at most three hydroxyl groups in a glucose monomeric unit in a poly alpha-1,6-glucan polymer or cationic poly alpha-1,6-glucan ether compound, the overall degree of substitution can be no higher than 3. It would be understood by those skilled in the art that, since a cationic poly alpha-1,6-glucan ether compound as disclosed herein can have a degree of substitution between 0.001 to 3.0, the substituents on the polysaccharide cannot only be hydroxyl. The degree of substitution of a poly alpha-1,6-glucan ether compound can be stated with reference to a specific substituent or with reference to the overall degree of substitution, that is, the sum of the DoS of each different substituent for an ether compound as defined herein. As used herein, when the degree of substitution is not stated with reference to a specific substituent or substituent type, the overall degree of substitution of the cationic poly alpha-1,6-glucan ether compound is meant. The degree of substitution may be a cationic degree of substitution, or even a net cationic degree of substitution. The target DoS can be chosen to provide the desired solubility and performance of a composition comprising a cationic poly alpha-1,6-glucan ether compound in the specific application of interest.

Cationic poly alpha-1,6-glucan ether compounds disclosed herein may have an average DoS with respect to a positively charged organic group in the range of from 0.001 to 3. A cationic poly alpha-1,6-glucan ether may have an average DoS of from 0.01 to 1.5. The poly alpha-1,6-glucan ether may have an average DoS of from 0.01 to 0.7. The poly alpha-1,6-glucan ether may have an average DoS of from 0.01 to 0.4. The poly alpha-1,6-glucan ether may have an average DoS of from 0.01 to 0.2. The average DoS of the poly alpha-1,6-glucan ether compound can be at least 0.001, 0.005, 0.1, 0.15, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. The average DoS may be from 0.01 to 1.5, preferably from 0.01 to 1.0, more preferably from 0.01 to 0.8, more preferably from 0.03 to 0.7, or from 0.04 to 0.6, or from 0.05 to 0.5. For performance reasons in through-the-wash applications (e.g., a laundry detergent used in a wash cycle), it may be preferable for the average DoS to be from 0.01 to 0.5, or from 0.01 to 0.25, or from 0.01 to 0.2, or from 0.03 to 0.15, or from 0.04 to 0.12. For performance reasons in through-the-rinse applications (e.g., a liquid fabric enhancer used in a rinse cycle), it may be preferably for the average DoS to be from 0.01 to 1, or from 0.03 to 0.8, or from 0.04 to 0.7, or from 0.05 to 0.6, or from 0.2 to 0.8, or from 0.2 to 0.6, or from 0.3 to 0.6, or from 0.4 to 0.6. The average DoS of the poly alpha-1,6-glucan may be from 0.01 to 0.6, more preferably from 0.02 to 0.5.

The cationic poly alpha-1,6-glucan ether compounds of the present disclosure may be characterized by an average cationic charge density. Cationic charge density may be expressed as milliequivalents of charge per gram of compound (meq/mol) and may be determined according to the method provided in the Test Methods section. The cationic poly alpha-1,6-glucan ether compounds of the present disclosure may be characterized by an average cationic charge density (or "CCD") of from 0.05 to 12 meq/g, or from 0.1 to 8 meq/g, or from 0.1 to 4 meq/g, or from 0.1 to 3 meq/g, or from 0.1 to 2.6 meq/g.

A positively charged organic group comprises a chain of one or more carbons having one or more hydrogens substituted with another atom or functional group, wherein one or more of the substitutions is with a positively charged group. The term "chain" as used herein encompasses linear, branched, and cyclic arrangements of carbon atoms, as well as combinations thereof.

The poly alpha-1,6-glucan ether derivative comprises a poly alpha-1,6-glucan ether substituted with at least one positively charged organic group on the polysaccharide backbone and/or on one or more of the optional branches. When substitution occurs on a glucose monomer contained in the backbone, the polysaccharide is derivatized at the 2, 3, and/or 4 glucose carbon position(s) with an organic group as defined herein which is linked to the polysaccharide through an ether (—O—) linkage in place of the hydroxyl group originally present in the underivatized (unsubstituted) poly alpha-1,6-glucan. When substitution occurs on a glucose monomer contained in a branch, the polysaccharide is derivatized at the 1, 2, 3, 4, or 6 glucose carbon position(s) with a positively charged organic group as defined herein which is linked to the polysaccharide through an ether (—O—) linkage.

A poly alpha-1,6-glucan ether compound as disclosed herein is termed a glucan "ether" herein by virtue of comprising the substructure $—C_G—O—C_R—$, wherein "$—C_G—$" represents a carbon of a glucose monomer unit of a poly alpha-1,6-glucan ether compound, and wherein "$—C_R—$" is comprised in the positively charged organic group. A cationic poly alpha-1,6-glucan monoether contains one type of a positively charged organic group. A cationic poly alpha-1,6-glucan mixed ether contains two or more types of positively charged organic groups. Mixtures of cationic poly alpha-1,6-glucan ether compounds can also be used.

Treatment compositions disclosed herein can comprise, or consist essentially of, one or more cationic poly alpha-1,6-glucan ether compounds as disclosed herein. A treatment composition may comprise one poly alpha-1,6-glucan ether compound. A treatment composition may comprise two or more poly alpha-1,6-glucan ether compounds, for example wherein the positively charged organic groups are different.

A treatment composition may comprise one or more cationic poly alpha-1,6-glucan ether compounds as disclosed herein, and may further comprise unsubstituted and/or non-cationic poly alpha-1,6-glucan compounds, which may be residual reactants that are unreacted/unsubstituted, or may have hydrolyzed. Typically, a low level of unsubstituted/non-cationic poly alpha-1,6-glucan ether compounds is preferred, as low levels may be indicative of reaction completeness with regard to the substitution, and/or chemical stability of the compounds in the treatment composition. The weight ratio of the cationic poly alpha-1,6-glucan ether compounds to unsubstituted/non-cationic poly alpha 1,6-glucan ether compounds may be 95:5 or greater, preferably 98:2 or greater, more preferably 99:1 or greater.

A "positively charged organic group" as used herein refers to a chain of one or more carbons that has one or more hydrogens substituted with another atom or functional group, wherein one or more of the substitutions is with a positively charged group. A positively charged group is typically bonded to the terminal carbon atom of the carbon chain. A positively charged organic group is considered to have a net positive charge since it comprises one or more positively charged groups, and comprises a cation (a positively charged ion). An organic group or compound that is "positively charged" typically has more protons than electrons and is repelled from other positively charged substances, but attracted to negatively charged substances.

An example of a positively charged groups includes a substituted ammonium group. A positively charged organic group may have a further substitution, for example with one or more hydroxyl groups, oxygen atoms (forming a ketone group), alkyl groups, and/or at least one additional positively charged group.

A positively charged organic group may comprise a substituted ammonium group, which can be represented by Structure II:

Structure II

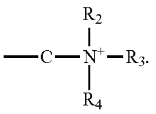

In Structure II, $R_2$, $R_3$ and $R_4$ may each independently represent a hydrogen atom, an alkyl group, or a $C_6$-$C_{24}$ aryl group. The carbon atom (C) shown in Structure II is part of the carbon chain of the positively charged organic group. The carbon atom is either directly ether-linked to a glucose monomer of poly alpha-1,6-glucan, or is part of a chain of two or more carbon atoms ether-linked to a glucose monomer of poly alpha-1,6-glucan. The carbon atom shown in Structure II can be —$CH_2$—, —CH— (where a H is substituted with another group such as a hydroxy group), or —C— (where both H's are substituted).

When $R_2$, $R_3$ and/or $R_4$ represent an alkyl group, the alkyl group can be a $C_1$-$C_{30}$ alkyl group, for example a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, $C_{25}$, $C_{26}$, $C_{27}$, $C_{28}$, $C_{29}$, or $C_{30}$ group. The alkyl group can be a $C_1$-$C_{24}$ alkyl group, or a $C_1$-$C_{18}$ or a $C_6$-$C_{20}$ alkyl group, or a $C_{10}$-$C_{16}$ alkyl group, or a $C_1$-$C_4$ alkyl group. When a positively charged organic group comprises a substituted ammonium group which has two or more alkyl groups, each alkyl group can be the same as or different from the other.

When $R_2$, $R_3$ and/or $R_4$ represent an aryl group, the aryl group can be a $C_6$-$C_{24}$ aryl group, optionally substituted with alkyl substituents. The aryl group can be a $C_{12}$-$C_{24}$ aryl group, optionally substituted with alkyl substituents, or a $C_6$-$C_{18}$ aryl group, optionally substituted with alkyl substituents.

A substituted ammonium group can be a "primary ammonium group", "secondary ammonium group", "tertiary ammonium group", or "quaternary ammonium" group, depending on the composition of $R_2$, $R_3$ and $R_4$ in Structure II. A primary ammonium group is an ammonium group represented by Structure II in which each of $R_2$, $R_3$ and $R_4$ is a hydrogen atom (i.e., —C—$NH_3^+$).

A secondary ammonium group is an ammonium group represented by Structure II in which each of $R_2$ and $R_3$ is a hydrogen atom and $R_4$ is a $C_1$-$C_{30}$ alkyl group or a $C_6$-$C_{24}$ aryl group. A "secondary ammonium poly alpha-1,6-glucan ether compound" comprises a positively charged organic group having a monoalkylammonium group. A secondary ammonium poly alpha-1,6-glucan ether compound can be represented in shorthand as a monoalkylammonium poly alpha-1,6-glucan ether, for example monomethyl-, monoethyl-, monopropyl-, monobutyl-, monopentyl-, monohexyl-, monoheptyl-, monooctyl-, monononyl-, monodecyl-, monoundecyl-, monododecyl-, monotridecyl-, monotetradecyl-, monopentadecyl-, monohexadecyl-, monoheptadecyl-, or monooctadecyl- ammonium poly alpha-1,6-glucan ether. These poly alpha-1,6-glucan ether compounds can also be referred to as methyl-, ethyl-, propyl-, butyl-, pentyl-, hexyl-, heptyl-, octyl-, nonyl-, decyl-, undecyl-, dodecyl-, tridecyl-, tetradecyl-, pentadecyl-, hexadecyl-, heptadecyl-, or octadecyl- ammonium poly alpha-1,6-glucan ether compounds, respectively. An octadecyl ammonium group is an example of a monoalkylammonium group wherein each of $R_2$ and $R_3$ is a hydrogen atom and $R_4$ is an octadecyl group. It would be understood that a second member (i.e., $R_1$) implied by "secondary" in the above nomenclature is the chain of one or more carbons of the positively charged organic group that is ether-linked to a glucose monomer of poly alpha-1,6-glucan.

A tertiary ammonium group is an ammonium group represented by Structure II in which $R_2$ is a hydrogen atom and each of $R_3$ and $R_4$ is independently a $C_1$-$C_{24}$ alkyl group or a $C_6$-$C_{24}$ aryl group. The alkyl groups can be the same or different. A "tertiary ammonium poly alpha-1,6-glucan ether compound" comprises a positively charged organic group having a dialkylammonium group. A tertiary ammonium poly alpha-1,6-glucan ether compound can be represented in shorthand as a dialkylammonium poly alpha-1,6-glucan ether, for example dimethyl-, diethyl-, dipropyl-, dibutyl-, dipentyl-, dihexyl-, diheptyl-, dioctyl-, dinonyl-, didecyl-, diundecyl-, didodecyl-, ditridecyl-, ditetradecyl-, dipentadecyl-, dihexadecyl-, diheptadecyl-, or dioctadecyl- ammonium poly alpha-1,6-glucan ether. A didodecyl ammonium group is an example of a dialkyl ammonium group, wherein $R_2$ is a hydrogen atom and each of $R_3$ and $R_4$ is a dodecyl group. It would be understood that a third member (i.e., $R_1$) implied by "tertiary" in the above nomenclature is the chain of one or more carbons of the positively charged organic group that is ether-linked to a glucose monomer of poly alpha-1,6-glucan.

A quaternary ammonium group is an ammonium group represented by Structure II in which each of $R_2$, $R_3$ and $R_4$ is independently a $C_1$-$C_{30}$ alkyl group or a $C_6$-$C_{24}$ aryl group (i.e., none of $R_2$, $R_3$ and $R_4$ is a hydrogen atom).

A quaternary ammonium poly alpha-1,6-glucan ether compound may comprise a trialkyl ammonium group, where each of $R_2$, $R_3$ and $R_4$ is independently a $C_1$-$C_{30}$ alkyl group. The alkyl groups can all be the same, or two of the alkyl groups can be the same and one different from the others, or all three alkyl groups can be different from one another. A quaternary ammonium poly alpha-1,6-glucan ether compound can be represented in shorthand as a trialkylammonium poly alpha-1,6-glucan ether, for example trimethyl-, triethyl-, tripropyl-, tributyl-, tripentyl-, trihexyl-, triheptyl-, trioctyl-, trinonyl-, tridecyl-, triundecyl-, tridodecyl-, tritridecyl-, tritetradecyl-, tripentadecyl-, trihexadecyl-, triheptadecyl-, or trioctadecyl-ammonium poly alpha-1,6-glucan ether. It would be understood that a fourth member (i.e., $R_1$) implied by "quaternary" in this nomenclature is the chain of one or more carbons of the positively charged organic group that is ether-linked to a glucose monomer of poly alpha-1, 6-glucan. A trimethylammonium group is an example of a trialkyl ammonium group, wherein each of $R_2$, $R_3$ and $R_4$ is a methyl group.

A positively charged organic group comprising a substituted ammonium group represented by Structure II can have each of $R_2$, $R_3$ and $R_4$ independently represent a hydrogen atom or an aryl group, such as a phenyl or naphthyl group, or an aralkyl group such as a benzyl group, or a cycloalkyl group such as cyclohexyl or cyclopentyl. Each of $R_2$, $R_3$ and $R_4$ may further comprise an amino group or a hydroxyl group.

The substituted ammonium group of the positively charged organic group is a substituent on a chain of one or more carbons that is ether-linked to a glucose monomer of the alpha-1,6-glucan. The carbon chain may contain from one to 30 carbon atoms. The carbon chain may be linear. Examples of linear carbon chains include, for example, $—CH_2—$, $—CH_2CH_2—$, $—CH_2CH_2CH_2—$, $—CH_2(CH_2)_2CH_2—$, $—CH_2(CH_2)_3CH_2—$, $—CH_2(CH_2)_4CH_2—$, $—CH_2(CH_2)_5CH_2—$, $—CH_2(CH_2)_6CH_2—$, $—CH_2(CH_2)_7CH_2—$, $—CH_2(CH_2)_8CH_2—$, $—CH_2(CH_2)_9CH_2—$, and $—CH_2(CH_2)_{10}CH_2—$; longer carbon chains can also be used, if desired. The carbon chain may be branched, meaning the carbon chain is substituted with one or more alkyl groups, for example methyl, ethyl, propyl, or butyl groups. The point of substitution can be anywhere along the carbon chain. Examples of branched carbon chains include $—CH(CH_3)CH_2—$, $—CH(CH_3)CH_2CH_2—$, $—CH_2CH(CH_3)CH_2—$, $—CH(CH_2CH_3)CH_2—$, $—CH(CH_2CH_3)CH_2CH_2—$, $—CH_2CH(CH_2CH_3)CH_2—$, $—CH(CH_2CH_2CH_3)CH_2—$, $—CH(CH_2CH_2CH_3)CH_2CH_2—$, and $—CH_2CH(CH_2CH_2CH_3)CH_2—$; longer branched carbon chains can also be used, if desired. Where the positively charged group is a substituted ammonium group, the first carbon atom in the chain is ether-linked to a glucose monomer of the poly alpha-1,6-glucan, and the last carbon atom of the chain in each of these examples is represented by the C in Structure II.

The chain of one or more carbons may be further substituted with one or more hydroxyl groups. Examples of a carbon chain having one or more substitutions with a hydroxyl group include hydroxyalkyl (e.g., hydroxyethyl, hydroxypropyl, hydroxybutyl, hydroxypentyl, hydroxyhexyl, hydroxyheptyl, hydroxyoctyl) groups and dihydroxyalkyl (e.g., dihydroxyethyl, dihydroxypropyl, dihydroxybutyl, dihydroxypentyl, dihydroxyhexyl, dihydroxyheptyl, dihydroxyoctyl) groups. Examples of hydroxyalkyl and dihydroxyalkyl (diol) carbon chains include $—CH(OH)—$, $—CH(OH)CH_2—$, $—C(OH)_2CH_2—$, $—CH_2CH(OH)CH_2—$, $—CH(OH)CH_2CH_2—$, $—CH(OH)CH(OH)CH_2—$, $—CH_2CH_2CH(OH)CH_2—$, $—CH_2CH(OH)CH_2CH_2—$, $—CH(OH)CH_2CH_2CH_2—$, $—CH_2CH(OH)CH(OH)CH_2—$, $—CH(OH)CH(OH)CH_2CH_2—$ and $—CH(OH)CH_2CH(OH)CH_2—$. In each of these examples, the first carbon atom of the chain is ether-linked to a glucose monomer of poly alpha-1,6-glucan, and the last carbon atom of the chain is linked to a positively charged group. Where the positively charged group is a substituted ammonium group, the last carbon atom of the chain in each of these examples is represented by the C in Structure II.

An example of a quaternary ammonium poly alpha-1,6-glucan ether compound is trimethylammonium hydroxypropyl poly alpha-1,6-glucan. The positively charged organic group of this ether compound can be represented by the following structure:

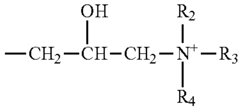

where each of $R_2$, $R_3$ and $R_4$ is a methyl group. The structure above is an example of a quaternary ammonium hydroxypropyl group.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain. A positively charged group can also comprise one or more imidazoline rings.

A cationic poly alpha-1,6-glucan ether compound as disclosed herein may be a salt. The counter ion for the positively charged organic group can be any suitable anion, including an acetate, borate, bromate, bromide, carbonate, chlorate, chloride, chlorite, dihydrogen phosphate, fluoride, hydrogen carbonate, hydrogen phosphate, hydrogen sulfate, hydrogen sulfide, hydrogen sulfite, hydroxide, hypochlorite, iodate, iodide, nitrate, nitride, nitrite, oxalate, oxide, perchlorate, permanganate, phosphate, phosphide, phosphite, silicate, stannate, stannite, sulfate, sulfide, sulfite, tartrate, or thiocyanate anion, preferably chloride. In an aqueous solution, a poly alpha-1,6-glucan ether compound is in a cationic form. The positively charged organic groups of a cationic poly alpha-1,6-glucan ether compound can interact with salt anions that may be present in an aqueous solution.

The poly alpha-1,6-glucan ether compound may comprise a positively charged organic group, wherein the positively charged organic group comprises a substituted ammonium group. From 0.5% to 50% of the backbone glucose monomer units of the ether compound may have branches via alpha-1,2 glycosidic linkages, and the positively charged organic group may comprise a substituted ammonium group. From 5% to 30% of the backbone glucose monomer units of the ether compound may have branches via alpha-1,2 glycosidic linkages, and the substituted ammonium group may comprise a substituted ammonium group. From 0.5% to 50% of the backbone glucose monomer units of the ether compound may have branches via alpha-1,2 glycosidic linkages, and the substituted ammonium group may comprise a trimethyl ammonium group. From 5% to 35% of the backbone glucose monomer units of the ether compound may have branches via alpha-1,2 glycosidic linkages, and the substituted ammonium group may comprise a trimethyl ammonium group.

The poly alpha-1,6-glucan ether compound may comprise a positively charged organic group, wherein the positively charged organic group comprises a trimethylammonium hydroxyalkyl group. From 0.5% to 50% of the backbone glucose monomer units of the ether compound may have branches via alpha-1,2 glycosidic linkages, and the positively charged organic group may comprise a trimethylammonium hydroxyalkyl group. From 5% to 30% of the backbone glucose monomer units of the ether compound may have branches via alpha-1,2 glycosidic linkages, and the positively charged organic group may comprise a trimethylammonium hydroxyalkyl group. From 0.5% to 50% of the backbone glucose monomer units of the ether compound may have branches via alpha-1,2 glycosidic linkages, and the trimethylammonium hydroxyalkyl group may comprise a trimethylammonium hydroxypropyl group. From 5% to 30% of the backbone glucose monomer units of the ether compound may have branches via alpha-1,2 glycosidic linkages, and the trimethylammonium hydroxyalkyl group may comprise a trimethylammonium hydroxypropyl group.

The poly alpha-1,6-glucan ether compound may comprise a positively charged organic group, wherein the positively charged organic group comprises a substituted ammonium group comprising a quaternary ammonium group. From 0.5% to 50% of the backbone glucose monomer units of the ether compound may have branches via alpha-1,2 glycosidic linkages, and the quaternary ammonium group may comprise at least one $C_1$ to $C_{18}$ alkyl group. From 5% to 30% of the backbone glucose monomer units of the ether compound may have branches via alpha-1,2 glycosidic linkages, the quaternary ammonium group may comprise at least one $C_1$ to $C_{18}$ alkyl group. From 0.5% to 50% of the backbone glucose monomer units of the ether compound may have branches via alpha-1,2 glycosidic linkages, and the quaternary ammonium group may comprise at least one $C_1$ to $C_4$ alkyl group. From 5% to 30% of the backbone glucose monomer units of the ether compound may have branches via alpha-1,2 glycosidic linkages, and the quaternary ammonium group may comprise at least one $C_1$ to $C_4$ alkyl group. From 0.5% to 50% of the backbone glucose monomer units of the ether compound may have branches via alpha-1,2 glycosidic linkages, and the quaternary ammonium group may comprise at least one $C_{10}$ to $C_{16}$ alkyl group. From 5% to 30% of the backbone glucose monomer units of the ether compound may have branches via alpha-1,2 glycosidic linkages, and the quaternary ammonium group may comprise at least one $C_{10}$ to $C_{16}$ alkyl group.

The poly alpha-1,6-glucan ether compound may comprise a quaternary ammonium group comprising one $C_{10}$ to $C_{16}$ alkyl group, where the quaternary ammonium group further comprises two methyl groups. From 0.5% to 50% of the backbone glucose monomer units of the ether compound may have branches via alpha-1,2 glycosidic linkages, and the quaternary ammonium group may comprise one $C_{10}$ to $C_{16}$ alkyl group further comprises two methyl groups. From 5% to 30% of the backbone glucose monomer units of the ether compound may have branches via alpha-1,2 glycosidic linkages, and the quaternary ammonium group may comprise one $C_{10}$ to $C_{16}$ alkyl group further comprises two methyl groups.

From 0.5% to 50% of the backbone glucose monomer units of the ether compound may have branches via alpha-1,2 glycosidic linkages, and the quaternary ammonium group may comprise one $C_{10}$ alkyl group and two methyl groups. From 5% to 30% of the backbone glucose monomer units of the ether compound may have branches via alpha-1,2 glycosidic linkages, and the quaternary ammonium group may comprise one $C_{10}$ alkyl group and two methyl groups.

The poly alpha-1,6-glucan ether compound may comprise a positively charged organic group, wherein the positively charged organic group comprises a quaternary ammonium hydroxyalkyl group. From 0.5% to 50% of the backbone glucose monomer units of the ether compound may have branches via alpha-1,2 glycosidic linkages, and the positively charged organic group may comprise a quaternary ammonium hydroxyalkyl group. From 5% to 30% of the backbone glucose monomer units of the ether compound may have branches via alpha-1,2 glycosidic linkages, and the positively charged organic group may comprise a quaternary ammonium hydroxyalkyl group. From 0.5% to 50% of the backbone glucose monomer units of the ether compound may have branches via alpha-1,2 glycosidic linkages, and the quaternary ammonium hydroxyalkyl group may comprise a quaternary ammonium hydroxymethyl group, a quaternary ammonium hydroxyethyl group, or a quaternary ammonium hydroxypropyl group. From 5% to 30% of the backbone glucose monomer units of the ether compound may have branches via alpha-1,2 glycosidic linkages, and the quaternary ammonium hydroxyalkyl group may comprise a quaternary ammonium hydroxymethyl group, a quaternary ammonium hydroxyethyl group, or a quaternary ammonium hydroxypropyl group. From 0.5% to 50% of the backbone glucose monomer units of the ether compound may have branches via alpha-1,2 glycosidic linkages, and the quaternary ammonium hydroxyalkyl group may comprise a quaternary ammonium hydroxymethyl group. From 5% to 30% of the backbone glucose monomer units of the ether compound may have branches via alpha-1,2 glycosidic linkages, and the quaternary ammonium hydroxyalkyl group may comprise a quaternary ammonium hydroxymethyl group. From 0.5% to 50% of the backbone glucose monomer units of the ether compound may have branches via alpha-1,2 glycosidic linkages, and the quaternary ammonium hydroxyalkyl group may comprise a quaternary ammonium hydroxyethyl group. From 5% to 30% of the backbone glucose monomer units of the ether compound may have branches via alpha-1,2 glycosidic linkages, and the quaternary ammonium hydroxyalkyl group may comprise a quaternary ammonium hydroxyethyl group. From 0.5% to 50% of the backbone glucose monomer units of the ether compound may have branches via alpha-1,2 glycosidic linkages, and the quaternary ammonium hydroxyalkyl group may comprise a quaternary ammonium hydroxypropyl group. From 5% to 30% of the backbone glucose monomer units of the ether compound may have branches via alpha-1,2 glycosidic linkages, and the quaternary ammonium hydroxyalkyl group may comprise a quaternary ammonium hydroxypropyl group.

Poly alpha-1,6-glucan ether compounds containing a positively charged organic group, such as a trimethyl ammonium group, a substituted ammonium group, or a quaternary ammonium group, can be prepared using methods similar to those disclosed in published patent application US 2016/0311935, which is incorporated herein by reference in its entirety. US 2016/0311935 discloses poly alpha-1,3-glucan ether compounds comprising positively charged organic groups and having an average degree of substitution of up to 3.0, as well as methods of producing such ether compounds. Cationic poly alpha-1,6-glucan ethers may be prepared by contacting poly alpha-1,6-glucan with at least one etherification agent comprising a positively charged organic group under alkaline conditions. For example, alkaline conditions may be prepared by contacting the poly alpha-1,6-glucan with a solvent and one or more alkali hydroxides to provide a solution or mixture, and at least one etherification agent is then added.

As another example, at least one etherification agent can be contacted with poly alpha-1,6-glucan and solvent, and then the alkali hydroxide can be added. The mixture of poly alpha-1,6-glucan, etherification agent, and alkali hydroxides can be maintained at ambient temperature or optionally heated, for example to a temperature between 25 °C and 200 °C, depending on the etherification agent and/or solvent employed. Reaction time for producing a poly alpha-1,6-glucan ether will vary corresponding to the reaction temperature, with longer reaction time necessary at lower temperatures and lower reaction time necessary at higher temperatures.

Typically, the solvent comprises water. Optionally, additional solvent can be added to the alkaline solution, for example alcohols such as isopropanol, acetone, dioxane, and toluene.

Alternatively, solvents such as lithium chloride(LiCl)/N, N-dimethyl-acetamide (DMAc), $SO_2$/ diethylamine (DEA)/ dimethyl sulfoxide (DMSO), LiCl/1,3-dimethy-2-imidazolidinone (DMI), N,N-dimethylformamide (DMF)/$N_2O_4$, DMSO/tetrabutyl-ammonium fluoride trihydrate (TBAF), N-methylmorpholine-N-oxide (NMMO), $Ni(tren)(OH)_2$ [tren-tris(2-aminoethyl)amine] aqueous solutions and melts of $LiClO_4 \cdot 3H_2O$, NaOH/urea aqueous solutions, aqueous sodium hydroxide, aqueous potassium hydroxide, formic acid, and ionic liquids can be used.

An etherification agent may be one that can etherify poly alpha-1,6-glucan with a positively charged organic group, where the carbon chain of the positively charged organic group only has a substitution with a positively charged group (e.g., substituted ammonium group such as trimethylammonium). Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group (e.g., substituted ammonium group such as trimethylammonium). Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group (e.g., substituted ammonium group such as trimethylammonium). Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group (e.g., substituted ammonium group such as trimethylammonium). Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group (e.g., substituted ammonium group such as trimethylammonium). Other examples of such etherification agents include dibutyl sulfate, dibutyl carbonate, butyl chloride, iodobutane and butyl triflate, where the butyl group(s) of each of these agents has one or more substitutions with a positively charged group (e.g., substituted ammonium group such as trimethylammonium). Other examples of etherification agents include halides of imidazoline-ring-containing compounds.

An etherification agent may be one that can etherify poly alpha-1,6-glucan with a positively charged organic group, where the carbon chain of the positively charged organic group has a substitution, for example a hydroxyl group, in addition to a substitution with a positively charged group, for example a substituted ammonium group such as trimethylammonium. Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group (e.g., substituted ammonium group such as trimethylammonium); an example is 3-chloro-2-hydroxypropyl-trimethylammonium. Additional examples of etherification agents comprising a positively charged organic group include 2,3-epoxypropyltrimethylammonium chloride, 3-chloro-2-hydroxypropyl dodecyldimethylammonium chloride, 3-chloro-2-hydroxypropyl cocoalkyldimethylammonium chloride, 3-chloro-2-hydroxypropyl stearyldimethylammonium chloride, and quaternary ammonium compounds such as halides of imidazoline-ring-containing compounds. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group (e.g., substituted ammonium group such as trimethylammonium).

When producing a poly alpha-1,6-glucan ether compound comprising two or more different positively charged organic groups, two or more different etherification agents would be used, accordingly. Any of the etherification agents disclosed herein may be combined to produce poly alpha-1,6-glucan ether compounds having two or more different positively charged organic groups. Such two or more etherification agents may be used in the reaction at the same time, or may be used sequentially in the reaction. When used sequentially, any of the temperature-treatment (e.g., heating) steps may optionally be used between each addition. Sequential introduction of etherification agents may be used to control the desired average DoS of each positively charged organic group. In general, a particular etherification agent would be used first if the organic group it forms in the ether product is desired at a higher average DoS compared to the average DoS of another organic group to be added.

The amount of etherification agent to be contacted with poly alpha-1,6-glucan in a reaction under alkaline conditions can be selected based on the average degree of substitution desired in the ether compound. The amount of average ether substitution groups on each monomeric unit in poly alpha-1,6-glucan ether compounds can be determined using nuclear magnetic resonance (NMR) spectroscopy. In general, an etherification agent can be used in a quantity of at least 0.05 mole per mole of poly glucan. There may be no upper limit to the quantity of etherification agent that can be used.

Reactions for producing poly alpha-1,6-glucan ether compounds can optionally be carried out in a pressure vessel such as a Parr reactor, an autoclave, a shaker tube, or any other pressure vessel well known in the art. Optionally, poly alpha-1,6-glucan ether compounds can be prepared under an inert atmosphere, with or without heating. As used herein, the term “inert atmosphere” refers to a nonreactive gas atmosphere such as nitrogen, argon, or helium.

After contacting the poly alpha-1,6-glucan, solvent, alkali hydroxide, and etherification reagent for a sufficient reaction time to produce a poly alpha-1,6-glucan ether compound, the reaction mixture can optionally be filtered by any means known in the art which allows removal of liquids from solids.

Following etherification, one or more acids may be optionally added to the reaction mixture to lower the pH to a neutral pH range that is neither substantially acidic nor substantially acidic, for example a pH of from 6 to 8, or 6.0, 6.2, 6.4, 6.6, 6.8, 7.0, 7.2. 7.4, 7.6, 7.8, or 8.0, if desired. Various acids useful for this purpose include sulfuric, acetic, hydrochloric, nitric, any mineral (inorganic) acid, any organic acid, or any combination of these acids.

A poly alpha-1,6-glucan ether compound can optionally be washed one or more times with a liquid that does not readily dissolve the compound. For example, a poly alpha-1,6-glucan ether can be washed with water, alcohol, isopropanol, acetone, aromatics, or any combination of these, depending on the solubility of the ether compound therein (where lack of solubility is desirable for washing). In general, a solvent comprising an organic solvent such as alcohol is preferred for the washing. A poly alpha-1,6-glucan ether product can be washed one or more times with an aqueous solution containing methanol or ethanol, for example. For example, 70-95 wt % ethanol can be used to wash the product. In another embodiment, a poly alpha-1,6-glucan ether product can be washed with a methanol: acetone (e.g., 60:40) solution.

A poly alpha-1,6-glucan ether compound can optionally purified by membrane filtration.

A poly alpha-1,6-glucan ether produced using the methods disclosed above can be isolated. This step can be performed before or after neutralization and/or washing steps using a funnel, centrifuge, press filter, or any other method or equipment known in the art that allows removal of liquids from solids. An isolated poly alpha-1,6-glucan ether product can be dried using any method known in the art, such as vacuum drying, air drying, or freeze drying.

Any of the above etherification reactions can be repeated using a poly alpha-1,6-glucan ether product as the starting material for further modification. This approach may be suitable for increasing the DoS of a positively charged organic group, and/or adding one or more different positively charged organic groups to the ether product. Also, this approach may be suitable for adding one or more organic groups that are not positively charged, such as an alkyl group (e.g., methyl, ethyl, propyl, butyl) and/or a hydroxyalkyl group (e.g., hydroxyethyl, hydroxypropyl, hydroxybutyl). Any of the above etherification agents, but without the substitution with a positively charged group, can be used for this purpose.

As described above, materials derived from sustainable/renewable feedstock materials are often desirable. Similarly, biodegradable materials may also be preferred. For example, biodegradable cationic poly alpha-1,6-glucan ether compounds are preferred over non-biodegradable materials from an environmental footprint perspective. The biodegradability of a material can be evaluated by methods known in the art, for example as disclosed in the Biodegradability Test Method section herein below. The cationic poly alpha-1,6-glucan ether compound may be characterized by a biodegradability as determined by the Biodegradability Test Method below (i.e., Carbon Dioxide Evolution Test Method—OECD Guideline 301B) of at least 10% on the $90^{th}$ day of the test duration. The cationic poly alpha-1,6-glucan ether compound may be characterized by a biodegradability, as determined by the Biodegradability Test Method below, of at least 5%, 10%, 15%, 20%, 25%, 30%, 35%, 40%, 45%, 50%, 55%, 60%, 65%, 70%, 75%, or 80%, or any value between 5% and 80%, on the 90th day of the test duration. The cationic poly alpha-1,6-glucan ether compound may be characterized by a biodegradability, as determined by the Biodegradability Test Method below, of at least 5%, 10%, 15%, 20%, 25%, 30%, 35%, 40%, 45%, 50%, 55%, or 60%, or any value between 5% and 60%, on the $60^{th}$ day of the test duration. Without wishing to be bound by theory, it is believed that the biodegradability profile of the presently described materials may be affected by the degree of substitution, the molecular weight, the degree of branching, and/or the solubility of the material. For example, it is believed that relatively lower degrees of substitution (e.g., lower cationic charge density) and/or increased solubility will be associated with higher degrees of biodegradability.

Wherein the water-soluble unit dose article is a multi-compartment unit dose article, the cationic poly alpha-1,6-glucan ether compound may be comprised in any compartment, or any combination of compartments, or even in each compartment.

Water-Soluble Film

The water-soluble film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30 °C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

The water-soluble film material can, for example, be obtained by casting, blow-moulding, extrusion or blown extrusion of the polymeric material, as known in the art.

The water-soluble film comprises polyvinylalcohol. The polyvinylalcohol may be present between 50% and 95%, preferably between 55% and 90%, more preferably between 60% and 80% by weight of the water soluble film. Preferably, the water-soluble film comprises polyvinyl alcohol homopolymer or polyvinylalcohol copolymer, preferably a blend of polyvinylalcohol homopolymers and/or anionic polyvinylalcohol copolymers preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer. Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinylalcohol homopolymer can include a true homopolymer having only vinyl alcohol units. Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %. Preferably, the polyvinyl alcohol, and/or in case of polyvinylalcohol blends the individual polyvinylalcohol polymers, have an average viscosity (μl) in a range of between 4 mPa·s and 30 mPa·s, preferably between 10 mPa·s and 25 mPa·s, measured as a 4% polyvinyl alcohol copolymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20 °C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 30,000 to 175,000, or 30,000 to 100,000, or 55,000 to 80,000. Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%. A suitable test method to measure the degree of hydrolysis is as according to standard method JIS K6726.

Most preferably the polyvinylalcohol is a blend of a polyvinylalcohol homopolymer and a carboxylated anionic polyvinylalcohol copolymer, wherein the homopolymer and the anionic copolymer are present in a relative weight ratio of 90/10 to 10/90, preferably 80/20 to 20/80, more preferably 70/30 to 50/50.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably the water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. the amount of lubricant/release agent in the water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film according to the invention has a residual moisture content of at least 4%, more preferably in a range of from 4% to 15%, even more preferably of from 5% to 10% by weight of the water-soluble film as measured by Karl Fischer titration.

Preferred films exhibit good dissolution in cold water, meaning unheated distilled water. Preferably such films exhibit good dissolution at temperatures of 24 °C, even more preferably at 10 °C. By good dissolution it is meant that the film exhibits water-solubility of at least 50%. preferably at least 75% or even at least 95%, as measured by the method set out here after using a glass-filter with a maximum pore size of 20 microns, described above.

Preferred films include those supplied by Monosol under the trade references M8630, M8900, M8779, M8310.

The film may be opaque, transparent or translucent. The film may comprise a printed area. The area of print may be achieved using standard techniques, such as flexographic printing or inkjet printing. Preferably, the ink used in the printed area comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

The process according to the present invention may comprise;

a. the first water-soluble film comprising polyvinylalcohol, preferably wherein the first water-soluble film comprises a polyvinylalcohol homopolymer or a polyvinylalcohol copolymer, more preferably a blend of polyvinylalcohol homopolymers and/or anionic polyvinylalcohol copolymers, even more preferably wherein the anionic polyvinylalcohol copolymers are selected from sulphonated and carboxylated anionic polyvinylalcohol copolymers especially carboxylated anionic polyvinylalcohol copolymers, most preferably wherein the first water-soluble film comprises a blend of a polyvinylalcohol homopolymer and a carboxylated anionic polyvinylalcohol copolymer;
b. the second water-soluble film comprising polyvinylalcohol, preferably wherein the second water-soluble film comprises a polyvinylalcohol homopolymer or a polyvinylalcohol copolymer, more preferably a blend of polyvinylalcohol homopolymers and/or anionic polyvinylalcohol copolymers, even more preferably wherein the anionic polyvinylalcohol copolymers are selected from sulphonated and carboxylated anionic polyvinylalcohol copolymers especially carboxylated anionic polyvinylalcohol copolymers, most preferably wherein the second water-soluble film comprises a blend of a polyvinylalcohol homopolymer and a carboxylated anionic polyvinylalcohol copolymer or wherein the second water-soluble film comprises a blend of polyvinyl alcohol homopolymers;
c. or a mixture thereof.

The water-soluble lid may comprise a third water-soluble film, and wherein the second water-soluble film and the third water-soluble film are sealed together to create at least one closed compartment between the second water-soluble film and the third water-soluble film; and wherein preferably the third water-soluble film comprises a polyvinylalcohol homopolymer or a polyvinylalcohol copolymer, more preferably a blend of polyvinylalcohol homopolymers and/or anionic polyvinylalcohol copolymers, even more preferably wherein the anionic polyvinylalcohol copolymers are selected from sulphonated and carboxylated anionic polyvinylalcohol copolymers especially carboxylated anionic polyvinylalcohol copolymers, most preferably wherein the third water-soluble film comprises a blend of a polyvinylalcohol homopolymer and a carboxylated anionic polyvinylalcohol copolymer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

EXAMPLES

Example 1: Synthesis of Cationically Modified Poly Alpha-1,6-Glucan Ether Compound, and Procedure of Making of Premix PP1, PP2 and PP3

This Example describes reaction and processing steps for producing a cationic alpha-glucan ether compound and formulations comprising this compound in a liquid organic medium. In particular, trimethylammonium hydroxypropyl alpha-1,2-branched alpha-1,6-glucan ether was prepared in formulations further comprising water and propylene glycol. Such liquid formulations can be used as an ingredient in producing various products, such as those disclosed herein.

Any alpha-1,2-branched alpha-1,6-glucan as disclosed herein can be used as a substrate for these etherification and processing procedures, for example. Examples of trimethylammonium hydroxypropyl alpha-1,2-branched alpha-1,6-glucan ether products that can be produced include those listed in Table 1A.

TABLE 1A

| Alpha-Glucan | | |
|---|---|---|
| MW (kDa) | Alpha-1,2 Branching | Ether DoS |
| 40 | 40% | 0.5 |
| 40 (75)** | 40% | 0.5 |
| 17 | 40% | 0.3 |
| 40 (84)** | 40% | 0.8 |
| 109 (148)** | 26% | 0.51 |
| 194 (245)** | 41% | 0.50 |
| 194 (269)** | 41% | 0.7 |
| 185 | 5% | 0.15 |
| 185 | 5% | 0.38 |
| 185 | 5% | 0.03 |
| 200 | 20% | 0.21 |
| 200 | 10% | 0.19 |
| 185 | 5% | 0.05 |
| 185 | 20% | 0.40 |
| 185 | 5% | 0.07 |
| 185 | 5% | 0.11 |
| 185 | 5% | 0.59 |
| 109 | 26% | 0.22 |

**Parenthetical number is molecular weight of ether compound (i.e., alpha-glucan plus derivatized cationic ether groups).
Abbreviations: MW, molecular weight. DoS, degree of substitution.

Three separate reactions were performed, respectively, in 100-L, 100-L and 500-L jacketed stainless steel reactors, each equipped with a pitched blade turbine (PBT) impeller and mixer. Temperature was maintained using a recirculating water bath connected to the reactor jacket. Reaction volumes were at 90 L, 90 L and 450 L, respectively, and charged with 372 g/L of a water-soluble alpha-1,2-branched alpha-1,6-glucan. An external recirculation loop was used to charge 7.65 g/L of sodium hydroxide into each reactor. Once the temperature of each preparation stabilized at 50 °C, a recirculation loop was used to charge 2,3-epoxypropyltrimethylammonium chloride (EPTAC, to 48.7 g/L) into each reactor. Conditions were maintained for 5 hours, after which the reactions were neutralized to pH 5-7 using 10 wt % sulfuric acid, thereby terminating the reactions.

Each neutralized reaction was entered into ultrafiltration (UF) purification with 5-kDa cut-off polyethersulfone (PES) membranes and three diafiltration washes. Afterwards, another UF was run on each sample to render an alpha-glucan ether polymer concentrate of 15-18 wt % solids. The concentration was measured using refractive index (RI) and approximately 50 g of each polymer concentrate was set aside for DoS analysis by NMR and total Kjeldahl nitrogen determination. Derivatization impurities analysis of residual EPTAC, 3-chloro-2-hydroxypropyltrimethylammonium chloride (CHPTAC) and (2,3-dihydroxypropyl)trimethylammonium chloride (DHPTAC) was determined by ion chromatography (IC) analysis. Propylene glycol was mixed into each polymer concentrate at equal solids concentration (15-18 wt %). Potassium sorbate preservative was added as a preservative. Each ether polymer mixture was then placed into an evaporator at 50-60 °C to remove ~33.2 wt % water. Approximately 50 g of each mixture was sampled to determine the concentrations of alpha-glucan ether polymer and propylene glycol using RI analysis and vacuum oven solids concentrations. The final composition of each formulation was ~33.3 wt % trimethylammonium hydroxypropyl alpha-1,2-branched alpha-1,6-glucan ether, ~33.3 wt % propylene glycol, ~33.3 wt % water, and potassium sorbate (Table 3A). The viscosity of each formulation was measured at 35 °C using an Anton Paar RheolabQC with $CC_{27}$ spindle (Table 1B).

TABLE 1B

| | | PP1 | PP2 | PP3 |
|---|---|---|---|---|
| Total Nitrogen (Kjeldahl) | g/100 g | 0.194 | 0.202 | 0.166 |
| Cationic Alpha-Glucan | wt % | 35.2% | 35.4% | 34.9% |
| Propylene Glycol | wt % | 30.7% | 31.0% | 32.2% |
| Viscosity (at $10^{-s}$, 35° C.) | cP | 9799 | 9561 | 10571 |
| EPTAC | mg/L | 10.6 | 10.9 | 11.0 |
| CHPTAC | mg/L | 18.4 | 15.4 | 18.3 |
| DHPTAC | mg/L | 208 | 140 | 317 |
| Water and minors. | | balance | balance | balance |

Table 1C provides additional cationic alpha-glucan ether formulations that were produced generally following the above methodology.

TABLE 1C

| | | Sample A | Sample B | Sample C | Sample D |
|---|---|---|---|---|---|
| Cationic Alpha-Glucan | wt % | 30.0% | 30.0% | 30.0% | 33.3% |
| Propylene Glycol | wt % | 36.0% | 38.5% | 40.0% | 33.3% |
| Water | wt % | 34.0% | 31.5% | 30.0% | 33.3% |
| | | Analytical Results | | | |
| Viscosity (at $10^{-s}$, 20° C.) | cP | 15562 | 18729 | 18835 | 25499 |
| Water activity | $a_w$ | 0.774 | 0.753 | 0.745 | 0.815 |

The liquid compositions in this Example and of the present disclosure have improved processibility and reduced water content. An organic solvent component (e.g., propylene glycol) of the liquid formulations enabled improved processibility while also reducing water content. It was important to control the water content to ensure that a liquid formulation would not negatively affect the packaging integrity of a single unit dose product containing the liquid formulation as an ingredient.

Example 2: Procedure of Making the Premix PP4

3 g of cationically modified poly alpha-1,6-glucan ether compound (in powder form, 100% active) is mixed with total of 7 g solvent (3.5 g water and 3.5 g propylene glycol) in a glass vile and mixed with a spatula. After complete dissolution of cationic modified poly alpha-1,6-glucan ether compound, 10 g of premix is obtained. From this, rheology has been measured as shown in Table 2A.

TABLE 2A

| Premix | PP4 |
|---|---|
| Cationically modified poly alpha-1,6-glucan ether compound (g) | 3 |
| Water (g) | 3.5 |

TABLE 2A-continued

| Premix | PP4 |
|---|---|
| Propylene glycol (g) | 3.5 |
| Viscosity (20 degree C.) | 9580 (@0.05 l/s) 2780 (@ 1000 l/s) |

Example 3: Procedure of Making the Premix PP5 to PP7

PP1, PP2 from Example 1 and PP4 from Example 2 are used as intermediate premix to create premix PP5 to PP7. Specifically, PP5 is made by mixing 60 wt. % of PP1 with 40% structuring agent; PP6 is made by mixing 75 wt. % of PP2 with 25% structuring agent; PP7 is made by mixing 80 wt. % of PP4 with 20% structuring agent.

TABLE 3A

| | | Sample | | |
|---|---|---|---|---|
| | ID | PP5 | PP6 | PP7 |
| | | intermediate premix | | |
| | | PP1 | PP2 | PP4 |
| intermediate premix | wt. % | 60 | 75 | 80 |
| Structuring agent (contain~70% of water [w/w]) | wt. % | 40 | 25 | 20 |

Example 4: Procedure of Making Water-Soluble Unit Dose Article Using Premix PP6

The following liquid detergent base is produced through standard mixing of the components described in table 4A below:

TABLE 4A

| Material | Wt % |
|---|---|
| Citric acid | 0.87 |
| 1,2-propanediol | 9.3 |
| Dipropyleneglycol | 4.63 |
| monoethanolamine | 9.38 |
| glycerol | 4.67 |
| HEDP chelant | 2.79 |
| $K_2SO_3$ | 0.06 |
| Neodol 24/7 | 5.52 |
| HLAS | 26.69 |
| Brightener 49 | 0.02 |
| TPK fatty acid | 2.01 |
| $C_{1214}AE_3S$ | 18.11 |
| Ethoxylated polyethyleneimine ($PEI_{600}EO_{20}$) | 4.94 |
| $MgCl_2$ | 1.27 |
| Water | Balance |

3.8 parts of the cationically modified poly alpha-1,6-glucan ether compound premix PP6 from Example 3 is mixed with 96.2 parts of the liquid detergent base mentioned above to obtain a liquid detergent composition comprising about 1% by weight of the cationically modified poly alpha-1,6-glucan ether compound for making soluble unit dose article.

Water-soluble unit dose article was made by following process steps comprising:

a. deforming a first water-soluble film to create an open cavity;

b. filling the open cavity with a liquid detergent composition comprising cationically modified poly alpha-1,6-glucan ether compound;

c. closing the open cavity with a water-soluble lid, wherein the water-soluble lid comprises a second water-soluble film;

d. sealing the first water-soluble film and the water-soluble lid together to create the water-soluble unit dose article;

What is claimed is:

1. A process of making a water-soluble unit dose article comprising the steps of:

a. deforming a first water-soluble film to create an open cavity;

b. filling the open cavity with a liquid detergent composition;

c. closing the open cavity with a water-soluble lid, wherein the water-soluble lid comprises a second water-soluble film; and d. sealing the first water-soluble film and the water-soluble lid together to create the water-soluble unit dose article;

wherein, the liquid detergent composition is prepared by the following steps:

i. providing a liquid detergent base, wherein the liquid detergent base comprises one or more detergent actives, one or more organic solvents, or a mixture thereof, and separately providing a cationically modified poly alpha-1,6-glucan ether compound premix;

ii. mixing the liquid detergent base and the cationically modified poly alpha-1,6-glucan ether compound premix;

wherein, the cationically modified poly alpha-1,6-glucan ether compound premix comprises:

from 20% to 50% by weight of the premix of the cationically modified poly alpha-1,6-glucan ether compound;

from 15 to 75% by weight of one or more organic solvents; and less than 50% by weight of water.

2. The process according to claim 1, wherein the cationically modified poly alpha-1,6-glucan ether compound comprises a cationically modified poly alpha-1,6-glucan backbone substituted with at least one positively charged organic group, wherein the poly alpha-1,6-glucan backbone has at least 65% of the glucose monomer units are linked via alpha-1,6-glycosidic linkages, and wherein the cationically modified poly alpha-1,6-glucan ether compound has an average degree of substitution of from 0.001 to 3, and is characterized by at least one of the following i-iv:

i) a weight average degree of polymerization of at least 5;

ii) a weight average molecular weight of from 1000 to 500,000 Daltons;

iii) being derived from a poly alpha-1,6-glucan having a weight average molecular weight of from 900 to 450,000 Daltons, determined prior to substitution with the least one positively charged organic group; or iv) a mixture thereof.

3. The process according to claim 2, wherein at least 3% of the backbone glucose monomer units have branches via alpha-1,2 and/or alpha-1,3-glycosidic linkages.

4. The process according to claim 2, wherein the at least one positively charged organic group comprises a substituted ammonium group, wherein the quaternary ammonium group comprises at least one $C_1$ to $C_{18}$ alkyl group.

5. The process according to claim 4, wherein the quaternary ammonium group comprises at least one $C_{10}$ to $C_{16}$ alkyl group.

6. The process according to claim 4, wherein the quaternary ammonium group comprises a trimethylammonium group.

7. The process according to claim 2, wherein the at least one positively charged organic group comprises a quaternary ammonium hydroxyalkyl group.

8. The process according to claim 2, wherein the cationically modified poly alpha-1,6-glucan ether compound comprises a backbone of glucose monomer units wherein at least 70% of the glucose monomer units are linked via alpha-1,6-glycosidic linkages.

9. The process according to claim 2, wherein the one or more organic solvent in the cationically modified poly alpha-1,6-glucan ether compound premix comprises ethanol, ethylene glycol, polyethylene glycol, 1,2-propanediol, dipropylene glycol, tripropyleneglycol, polypropylene glycol, glycerol, or a mixture thereof.

10. The process according to claim 2, wherein the one or more organic solvents in the liquid detergent base comprises ethanol, ethylene glycol, polyethylene glycol, 1,2-propanediol, dipropylene glycol, tripropyleneglycol, polypropylene glycol, glycerol, or a mixture thereof.

11. The process according to claim 2, wherein a weight ratio of liquid detergent base to cationically modified poly alpha-1,6-glucan ether compound premix is between 70:30 and 99.5:0.5.

12. The process according to claim 2, wherein the cationically modified poly alpha-1,6-glucan ether compound premix is at a temperature of between 15 °C and 50 °C.

13. The process according to claim 1, wherein:

a. the first water-soluble film comprises polyvinylalcohol;

b. the second water-soluble film comprises polyvinylalcohol;

c. or a mixture thereof.

14. The process according to claim 1, wherein the water-soluble lid comprises a third water-soluble film, and wherein the second water-soluble film and the third water-soluble film are sealed together to create at least one closed compartment between the second water-soluble film and the third water-soluble film.

15. The process according to claim 1, wherein the liquid detergent base further comprises enzymes, perfumes, surfactants, polymers, dyes, or a mixture thereof.

16. The process according to claim 15, wherein the surfactants comprise anionic surfactants, non-ionic surfactants, cationic surfactants, amphoteric surfactants, zwitterionic surfactants, or a mixture thereof.

17. The process according to claim 1, wherein following preparation of the liquid detergent base, the liquid detergent base is separated into at least a first stream and a second stream, wherein the cationically modified poly alpha-1,6-glucan ether compound added in the form of a cationically modified poly alpha-1,6-glucan ether compound premix is added to at least the first stream, and wherein each stream is added to the same or different open cavities of the same or different water-soluble unit dose articles.

18. The process according to claim 1, wherein said process is a continuous process or a batch process.

19. A process for making a cationically modified poly alpha-1,6-glucan ether compound premix comprising the steps of:

a. mixing a cationically modified poly alpha-1,6-glucan ether compound in solid form and one or more organic solvents to create a poly alpha-1,6-glucan ether compound premix; or b. mixing a cationically modified poly alpha-1,6-glucan ether compound in solid form or liquid form and one or more organic solvents to create a poly alpha-1,6-glucan ether compound intermediate, then removing the solvents to create a concentrated a poly alpha-1,6-glucan ether compound premix.

20. The process according to claim 19, wherein a viscosity adjusting agent is added to the poly alpha-1,6-glucan ether compound premix.

21. The process according to claim 1, wherein the process further comprises the following steps for making the cationically modified poly alpha-1,6-glucan ether compound premix:

a. mixing the cationically modified poly alpha-1,6-glucan ether compound in solid form and one or more organic solvents to create the poly alpha-1,6-glucan ether compound premix; or b. mixing the cationically modified poly alpha-1,6-glucan ether compound in solid form or liquid form and one or more organic solvents to create a poly alpha-1,6-glucan ether compound intermediate, then removing the solvents to create a concentrated a poly alpha-1,6-glucan ether compound premix.

* * * * *